United States Patent
Martin et al.

(10) Patent No.: US 6,832,550 B2
(45) Date of Patent: Dec. 21, 2004

(54) INK AND DAMPENING SOLUTION DETERMINATION IN OFFSET PRINTING

(75) Inventors: Alistair Scott Martin, Queenscliff (AU); Roger Pryce Netterfield, Turramurra (AU); Christopher Hayes Freund, McGraths Hill (AU); Monty Glass, Ryde (AU); David Ian Farrant, Ryde (AU); Michael Lawrence Brothers, Cambridge Gardens (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 10/221,085

(22) PCT Filed: Mar. 7, 2001

(86) PCT No.: PCT/AU01/00235

§ 371 (c)(1),
(2), (4) Date: Oct. 24, 2002

(87) PCT Pub. No.: WO01/66352

PCT Pub. Date: Sep. 13, 2001

(65) Prior Publication Data

US 2003/0110963 A1 Jun. 19, 2003

(30) Foreign Application Priority Data

Mar. 9, 2000 (AU) ............................................ PQ6112

(51) Int. Cl.[7] ............................ B41F 31/02; B41F 33/10
(52) U.S. Cl. .................... 101/349.1; 101/147; 101/484; 356/448
(58) Field of Search ................................ 101/147, 148, 101/335, 349.1, 350.1, 450.1, 484, DIG. 45; 356/445, 446, 448, 369

(56) References Cited

U.S. PATENT DOCUMENTS 4,151,796 A * 5/1979 Uhrig ......................... 101/142
4,407,197 A * 10/1983 Jeschke ....................... 101/148
4,565,450 A * 1/1986 Wirz et al. ................... 356/402
4,677,298 A * 6/1987 Zelmanovic et al. ..... 250/341.8
4,737,035 A * 4/1988 Aoki et al. ................... 356/445

(List continued on next page.)

FOREIGN PATENT DOCUMENTS

| | | |
|---|---|---|
| CA | 2230222 | 9/1998 |
| DE | 3414573 | 10/1985 |
| JP | 9133517 | 9/1995 |
| JP | 10038513 | 7/1996 |
| JP | 10047926 | 8/1996 |
| JP | 11344314 | 5/1998 |
| JP | 2000065538 | 8/1998 |

OTHER PUBLICATIONS

Derwent Abstract Accession No. 98–183021/17, Class U11, JP 10038513 A (Nikon Corp) Feb. 13, 1998.

*Primary Examiner*—Stephen R. Funk
(74) *Attorney, Agent, or Firm*—Ladas & Parry LLP

(57) ABSTRACT

An optical instrument for determining properties of the imaging and non-imaging areas of offset printing plates is disclosed. A laser light source (30) directs a laser beam (35) at the surface layer (50) of an offset printing plate (60). A specularly reflected beam (45) is detected by a light detector (40). Additionally. scattered light (55) is detected by a light detector (50). The detectors (40, 50) produce light intensity signals for the reflected and scattered light, respectively. A data processor (70) processes the intensity signals to determine various properties relating to the dampening solution and ink present on the non-imaging and imaging areas of the printing plate, respectively. These properties include the thickness of dampening solution in non-imaging areas, the image density in imaging areas of a moving printing plate, and the occurrence of scumming in non-imaging areas of a printing plate. The processed intensity signals also may be utilised to control the application of ink and dampening solution to an offset printing press.

42 Claims, 17 Drawing Sheets

U.S. PATENT DOCUMENTS

| | | | | |
|---|---|---|---|---|
| 4,787,238 A | * | 11/1988 | Seki et al. | 356/446 |
| 4,976,545 A | * | 12/1990 | Kipphan et al. | 356/446 |
| 5,090,316 A | * | 2/1992 | Rodi et al. | 101/148 |
| 5,185,644 A | * | 2/1993 | Shimoyama et al. | 356/369 |
| 5,249,036 A | * | 9/1993 | Balducci | 356/445 |
| 5,520,113 A | * | 5/1996 | Joss et al. | 101/484 |
| 5,646,738 A | * | 7/1997 | Honkawa et al. | 356/445 |
| 5,713,286 A | * | 2/1998 | Zorn | 101/450.1 |

* cited by examiner

INK AND DAMPENING SOLUTION DETERMINATION IN OFFSET PRINTING

TECHNICAL FIELD OF THE INVENTION

The present invention relates generally to thin films on moving or stationary surfaces and, in particular, to near real-time monitoring of such films on the printing plates of offset printing machines.

BACKGROUND ART

Offset printing uses ink and dampening solutions to differentiate between the printing and non-printing areas of the printing plate. The hydrophilic property of the non-image areas and the oleophilic property of the image areas are the fundamental prerequisites of the offset printing process. In order to produce consistently high quality output, it is necessary to adequately coat the imaging areas of the printing plate with ink and the non-imaging areas with dampening solution. A clean, sharp image is produced when the ratio of ink to dampening solution is able to clearly distinguish between the non-imaging and imaging areas.

In simple terms, a non-printing area carries a layer of dampening solution, whereas a printing area has a layer of photolithographic film to which ink will adhere. There also will be a small contribution by dampening solution to the ink in a printing area.

In the art it is common to refer to dampening solution simply as "water", leading to the expression "ink/water balance", referring to the ratio of ink to dampening solution, (or vice versa) between printing and non-printing areas.

If too little ink is applied the image becomes faint, colour balance incorrect, image density becomes non-uniform and sharp edges become blurred. On the other hand, if too much ink is applied, the image has poor edge definition, mottling of non-printing areas (scumming) can occur, incorrect colour balance results and there is an increased risk of ink rub-off and set-off (ie. transfer of ink between pages when folded).

Both over- and under-inking lead to a reduction in print quality and such printed material may have to be discarded. Maintaining the print quality above the minimum level leads to a reduction in wastage and saves paper, ink and dampening solution.

Different presses and operating conditions require different ink/water balances to achieve optimum print quality. In addition to achieving the correct balance between ink and water, the absolute amounts of ink and water have a secondary effect. Reduction of both water and ink will at some stage result in scumming and is to be avoided. Increase of both water and ink will maintain print quality, but will use wasteful amounts of both to achieve the same result. It will also result in rub-off and set-off where the excess ink is easily removed in the course of normal handling. The target that produces high quality print and highly economical print output is a correct ink/water balance marginally above the scumming levels. In practice, this target zone tends to change throughout the print run as conditions gradually change as a result of such factors as press temperature and wear on the printing plates.

The printing industry relies heavily on subjective measurements to determine the quality of the output product. In particular, visual inspection is used to grade a printed product against an agreed set of industry standards. The printing machine operators then adjust the ratio of ink to dampening solution based on acquired personal experience. Using the current method of visual inspection on a sampled point, gradual or intermittent deterioration in the print quality may not be noticed by the printing machine operators. The quality of the printing also may vary from print run to print run, depending on the personnel involved.

Attempts to find solutions to the problem of dampening solution thickness can be noted from U.S. Pat. No. 5,646,738 (issued to Fukuoka et al., on Feb. 29, 2000), U.S. Pat. No. 6,029,577 (issued to Honkawa et al., on Jul. 8, 1997) and U.S. Pat. No. 4,737,035 (issued to Aoki et al., on Apr. 12, 1988). None of these prior art documents provide a near-real time determination of changes in thickness of dampening solution. Nor do any one of the above-mentioned documents provide high spatial resolution measurement (ie. less than 1 $mm^2$ measurement area).

U.S. Pat. No. 5,341,734 (issued to Jeschke et al, on Aug. 30, 1994) describes the removal of some dampening solution (using application of energy) from a test pattern area on a plate. The test pattern, therefore, prints at a lower dampening than the rest of the plate and so will begin to scum before the rest of the plate. Scumming is measured in the test area as a migration of ink into the non-imaging area.

U.S. Pat. No. 5,551,342 (issued to Fuchs et al, on Sep. 3, 1996), U.S. Pat. No. 5,568,769 (issued to Leuerer, on Oct. 29, 1996) and U.S. Pat. No. 4,649,502 (issued to Keller et al, on Mar. 10, 1987) all describe methods of measuring the ink density on the printed pages at the point of exit from the press. Ink density measurements are compared with either a stored set point or a measurement from an original proof copy and a feedback signal used to correct the press settings.

When a reduction in ink density is measured (on plate, blanket or paper) none of the prior art disclosures is capable of determining whether it is a result of under-inking (ie. not enough ink) or over-dampening (ie. too much water giving rise to excessive emulsification).

It is an object of the invention to accurately, and in near-real time gain an indication of the thickness of dampening solution and/or ink, thereby overcoming or at least ameliorating one or more problems associated with the prior art. It is also desirable to provide for the automated monitoring of both ink and dampening solution, and their relative amounts, and further, to provide control mechanisms for printing presses based thereupon.

DISCLOSURE OF THE INVENTION

There is provided a method for determining changes in the thickness of dampening solution in non-imaging areas of offset printing plates, comprising the steps of:

directing a light source at an offset printing plate, the light source being of a known intensity;

detecting light specularly reflected from said plate and forming an intensity signal thereof; and determining a relative change in said detected light intensity signal as an indicator of changes in the thickness of dampening solution.

There is further provided an instrument for determining changes in the thickness of dampening solution on offset printing plates, comprising:

a light source for directing light of a known intensity at an offset printing plate;

a light detector for receiving light specularly reflected from said plate and producing an intensity signal thereof; and a data processor for determining a relative change in the reflected light intensity signal, changes in which being an indicator of changes in the thickness of dampening solution.

The relative change in the detected light intensity signal may be determined as a ratio of the source light intensity signal and the detected light intensity signal, or directly from the detected light intensity signal when the source light intensity is held constant.

There is yet further provided a method for determining changes in the image density on a moving offset printing plate, comprising the steps of:

directing a light source at said offset printing plate;

detecting light scattered from said plate and forming a signal representative of the intensity thereof;

data processing said scattered intensity signal to identify imaging areas; and further data processing said imaging data to determine image density in each imaging area.

There is yet further provided an instrument for determining changes in the image density on a moving offset printing plate, comprising:

a light source for directing light at an offset printing plate;

a light detector for receiving light scattered from said plate and producing an intensity signal thereof; and a data processor for identifying imaging areas from said scattered intensity signal, and for determining image density in each imaging area.

For the non-imaging area, the scattered intensity signal is ascribed to be zero density, which value is used as a reference to determine the image density. A threshold value level can be defined to discriminate between imaging and non-imaging areas by comparing the scattering intensity signal of thereto.

There is yet further provided a method for determining the thickness of dampening solution on a moving offset printing plate, comprising the steps of:

directing a light source at said offset printing plate;

detecting light scattered from said plate and forming an intensity signal thereof;

detecting light specularly reflected from said plate and forming an intensity signal thereof;

data processing said scattered intensity signal to identify non-imaging areas;

filtering said reflected intensity signal to accept only data corresponding to said identified non-imaging areas; and determining dampening solution thickness from said filtered data.

There is yet further provided an instrument for determining the thickness of dampening solution on a moving offset printing plate, comprising:

a light source at an offset printing plate;

a light detector for receiving light scattered from said plate and forming an intensity signal thereof;

a light detector for receiving light specularly reflected from said plate and forming an intensity signal thereof; and a data processor for processing said scattered intensity signal to identify non-imaging areas, filtering said reflected intensity signal to accept only data corresponding to non-imaging areas, and determining dampening solution thickness from said filtered data.

Filtering can be achieved by applying a spatial mapping of the printing plate to the reflected intensity signal to pass only data relating to non-imaging areas. A threshold value level can be defined to discriminate between imaging and non-imaging areas by comparing the scattering intensity signal thereto.

There is yet further provided a method for determining the occurrence of scumming in an offset printing press, comprising the steps of:

directing a light source at said offset printing plate;

detecting light scattered from said plate and forming an intensity signal thereof;

storing a record of one or more positions representing non-imaging areas; and data processing said scattered intensity signal to identify the presence of ink at said positions.

There is yet further provided an instrument for determining the occurrence of scumming in an offset printing press, comprising:

a light source for directing light at an offset printing plate, the light source being of a known intensity;

a light detector for receiving light scattered from said plate and producing an intensity signal thereof; and a data processor storing a record of one or more positions representing non-imaging areas, and processing said scattered intensity signal to identify the presence of ink at said positions.

The scattered intensity signal may be compared against a threshold value that represents the onset of scumming. The threshold value can be derived from data collected from a printing plate absent ink.

There is yet further provided an optical instrument for determining properties of the imaging and non-imaging areas of moving offset printing plate, comprising:

a light source arranged to direct a beam of light towards said offset printing plate;

a first light detector arranged to receive light specularly reflected from said plate and produce an intensity signal thereof; and a second light detector for detecting light scattered from said plate and produce an intensity signal thereof.

The light source may be arranged to direct light at an acute angle with respect to the printing plate surface. Furthermore, the first detector may be arranged at a similar acute angel, and the second detector arranged to be substantially normal to the printing plate surface. Most preferably, the light source is a laser source. The light source, first and second detectors may be housed within a single enclosure. There may be further provided a data processor for receiving and processing the reflected intensity signal and the scattered intensity signal.

BRIEF DESCRIPTION OF THE DRAWINGS

A number of embodiments of the present invention will now be described with reference to the drawings, in which.

DETAILED DESCRIPTION INCLUDING BEST MODE

Measurement Instrument

Figure 1:
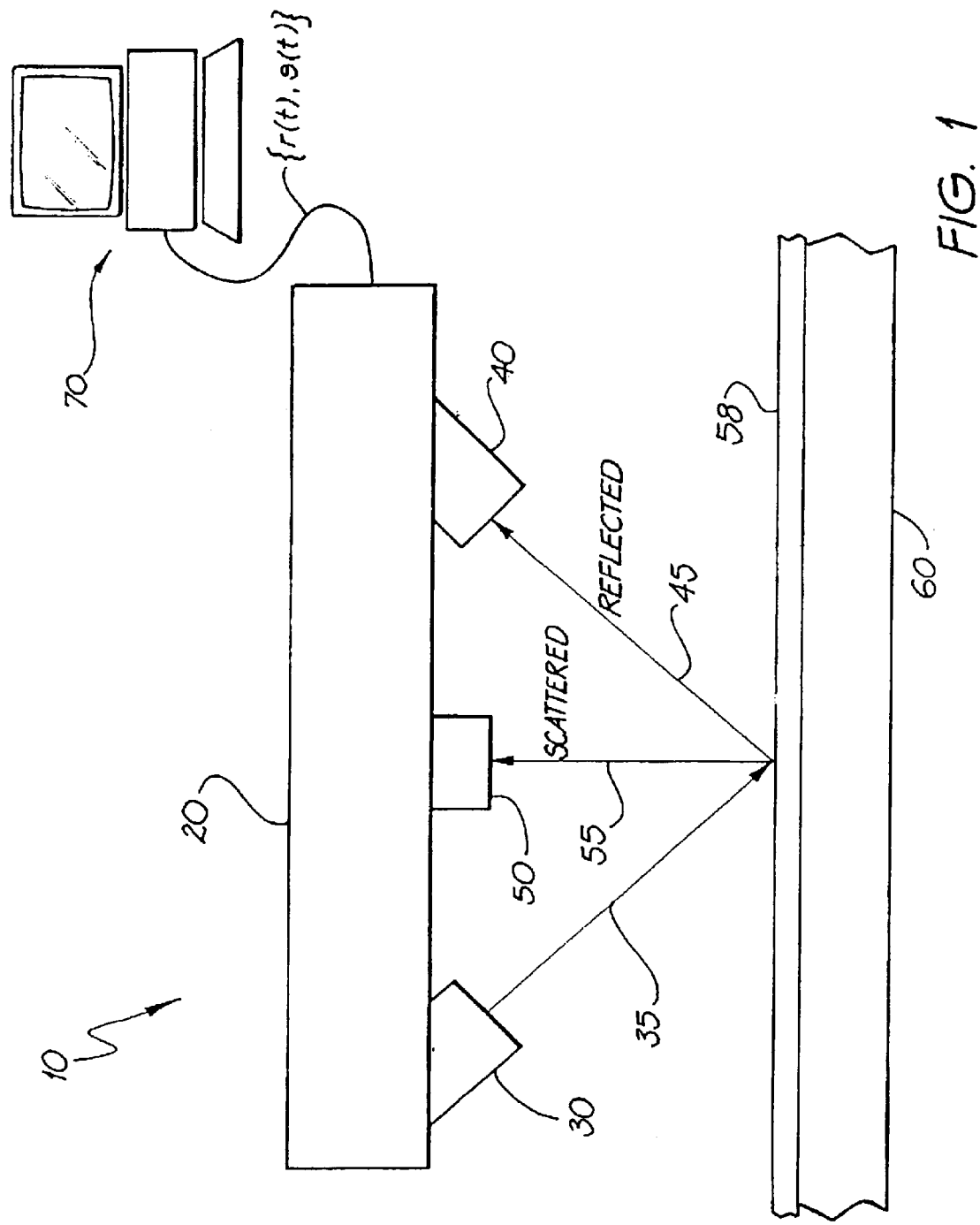
FIG. 1 is a schematic diagram representation of an embodiment of measurement apparatus with reference to an idealised printing plate.

FIG. 1 shows an instrument 10, in which an enclosure of 20, containing electronic components (to be described presently) contains a directed light source 30, a detector of reflected light 40 and a detector of scattered light 50. The source light follows an incident path 35, and once having interacted with the (idealised) thin film surface 58, lying on a printing plate 60, results in a specularly reflected path 45 and a scattered path 55.

The directed light source 30 may be any source of light, but is preferably a laser due to the ready availability and the ease with which such a light source may be directed at a given target. The detectors 40 and 50 are readily implemented using commercially available silicon cell detectors. Optical filters associated with the light source 30 and the detectors 40, 50 have not been shown for the sake of clarity.

More particularly, the light source 30 can conveniently be a 650 nm, 3 mW diode laser module with a collimating lens using plastics asphere 300-0360-780. A model DLM 2103-650 laser module manufactured by Optima Precision, Inc. of the United States is suitable. The light source can be collimated or focused in order to detect different sized areas on the plate depending on the application/press speed. Additionally, the light can be polarised near the source, preferably using s-polarisation (in which the electric vector is orthogonal to the plane of incidence) to maximise the reflected signal intensity at the preferred angle of incidence. Filters too can be incorporated (as noted) to block interfering wavelengths from, say, artificial lighting or sunlight, typically located immediately before the detectors. Laser light sources of other wavelengths may be gainfully employed depending on the colour and/or density of ink being measured for scumming.

The detectors 40, 50 can be a silicon photodiode type, such as the OSD15-5T model, available from Centronic Ltd of the United Kingdom, that have an active area of 15 mm$^2$ and a wavelength range of 400–1050 nm. Output data signals r(t), s(t) from the reflection and scattering detectors 40, 50 are provided to a convenient form of data processor 70.

Figure 2A:
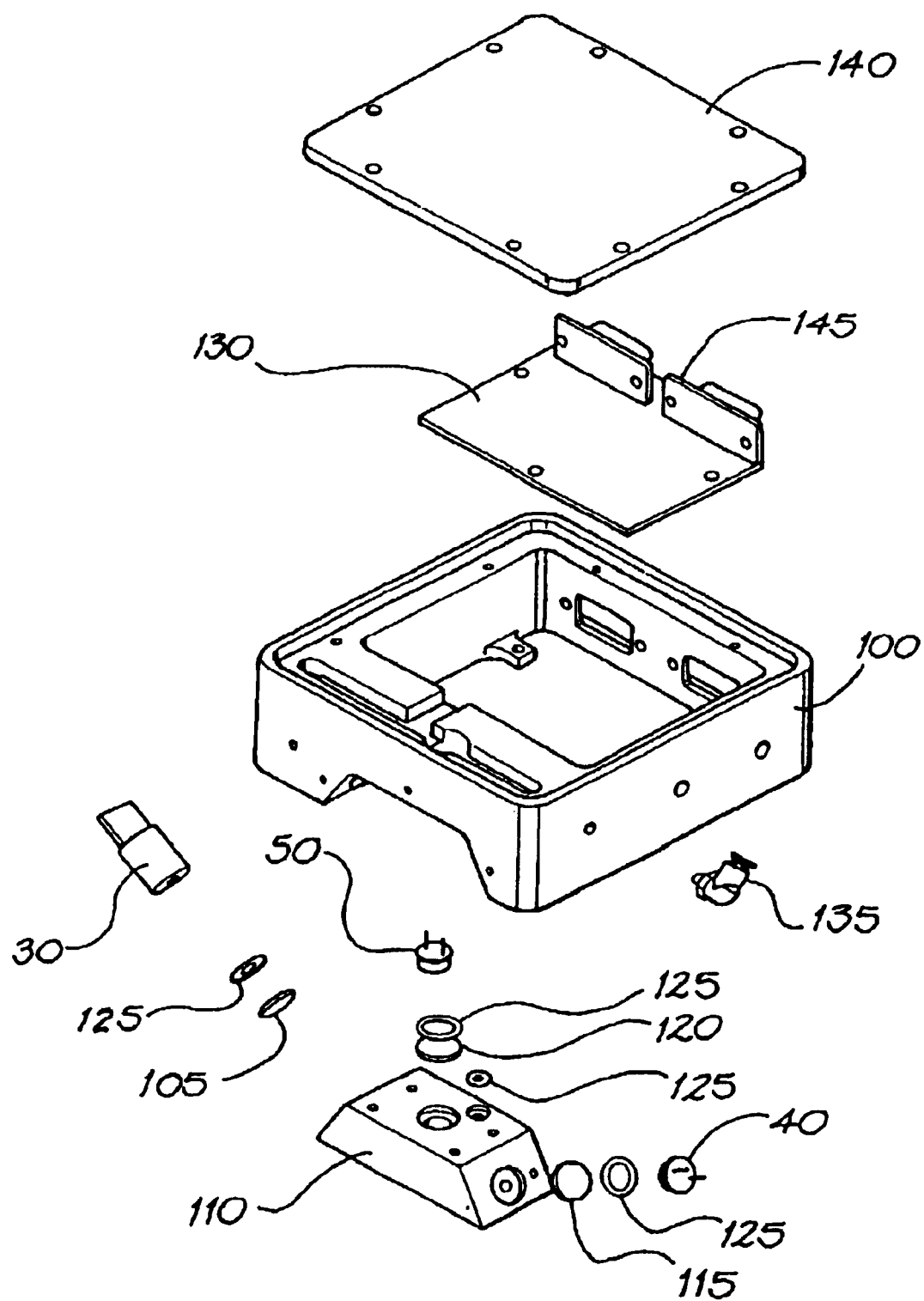
FIG. 2A is a schematic diagram representation of an exploded view of an embodiment of the apparatus.

FIG. 2A shows an exploded schematic diagram representation of the instrument 10 of the apparatus of FIG. 1. A main body 100 is provided as an airtight, rugged enclosure for the constituent components. The laser 30, having a measurement beam spot size in the range 0 mm$^2$ to 25 mm$^2$, provides a directed coherent light source and passes through an optical element 105 before exiting the apparatus via the clear vision module 110. The reflection detector 40 is positioned so as to detect specularly reflected light once that light passes through an optical element 115. The specular detector 50 is mounted vertically so as to detect scatter light, passing through an optical element 120. Respective O-rings 125 are provided to mount the various optical elements 105, 115, 120.

The control of the laser 30 is provided via an electronics board 130 that act to maintain the intensity of light from the laser 30 to be constant (at any appropriate level). The particular electronic circuit will be described with reference to FIG. 2B.

In order to ensure that the optical elements and the detectors remain dust, vapour and mist free, an air line 135 for the air windows, supplying dry, compressed air, is provided. By this arrangement, cleaning and maintenance are not regularly required.

A top plate 140 completes the assembly of the apparatus for its industrial application. The dimensions of the apparatus are approximately 32H×94W×96L mm. The instrument 10 is designed to operate at a working distance of 8 mm above a stable measurement surface and is capable of providing a minimum of 1000 measurements per second continuously. Of course, the dimensions of the instrument can be varied according to the physical dictates of individual requirements.

Figure 2B:
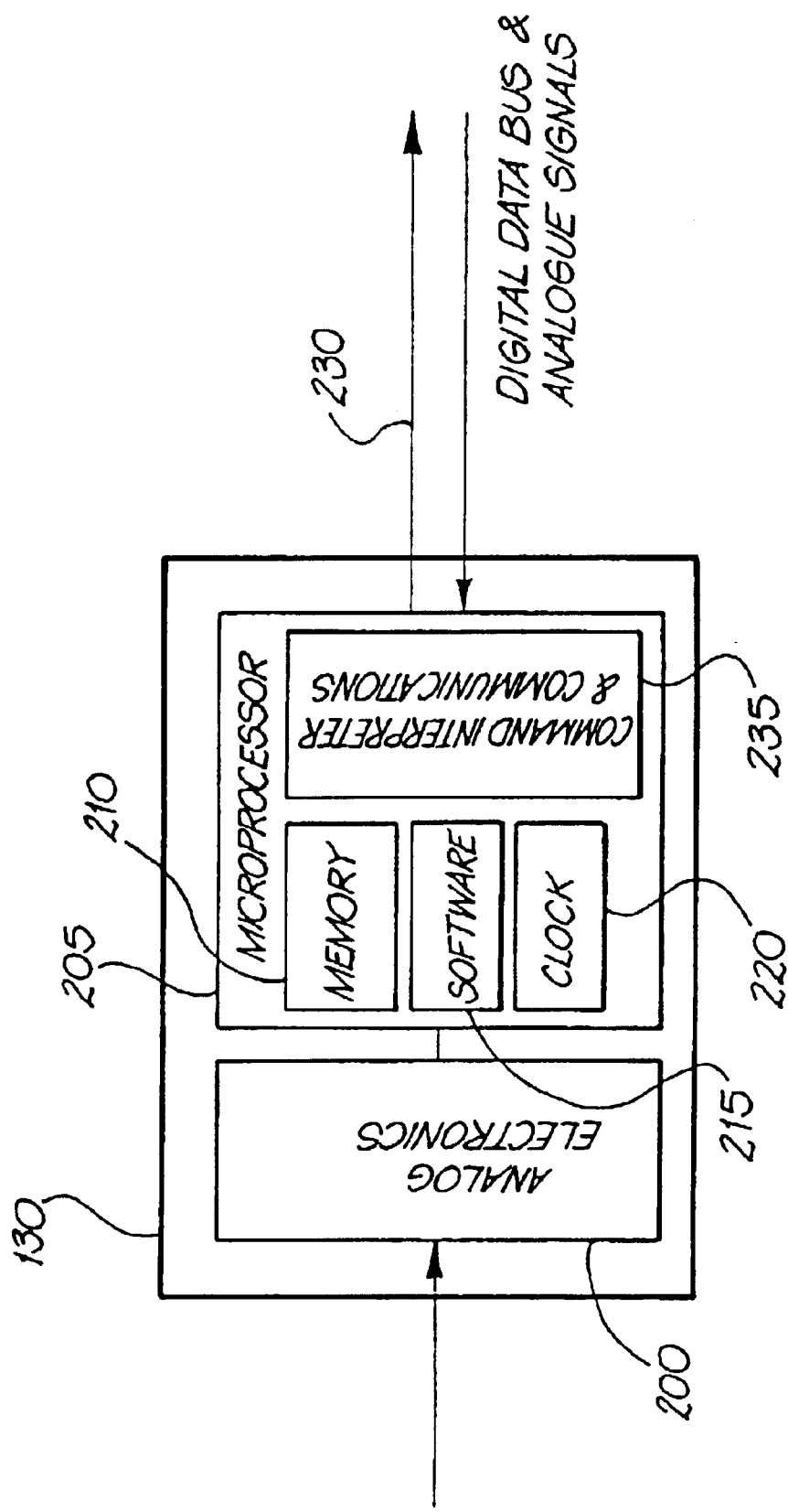
FIG. 2B is a schematic circuit diagram of the electronics module shown in FIG. 2A.

Referring again to FIG. 1, the personal computer 70, receives a preprocessed signal from the reflection detector 40 and the scatter detector 50 the pre-processing is performed 'on-board' the instrument. Referring now to FIG. 2B, a preferred embodiment of the microprocessor-based electronics is shown. The analog signals from the two detectors 40, 50 are provided to an analog-to-digital circuit 200 (Texas Instruments TMS 320F241), that typically operates as 20 MHz. A microprocessor 205 (Texas Instruments TMS 320F241) has constituent memory 210, memory (RAM and ROM) 215, a system clock 220 and a communications interface 225. The connectors 145 shown in FIG. 2A represent the bi-directional data bus 230, typically on the RS485 Standard. The function performed by the microprocessor include:

detection of plate gaps,
calculation of position relative to the plate gap,
calculation of the printing press speed,
discrimination of imaging and non-imaging areas,
determination of dampening solution thickness,
determination of ink thickness,
statistical operations, such as calculation of averages,
standard deviations, statistical process control limits,
triggering of measurements at preset plate positions,
communication with host system, and
diagnostic self checking and reporting status to host.

Determination of Dampening Solution Thickness

A first embodiment provides for near real-time measurement of dampening solution thickness on a non-imaging part of a printing plate. It applies only to non-imaging areas, such as a bare printing plate or a printing roller. The operating principle is to direct a light source, which need not be coherent, at the non-imaging portion of the printing roller, which is covered by a thin film of dampening material. The amount of light reflected from the thin film is measured, and a ratio obtained of the intensities of the reflected light versus the input light, (i.e., $I_r/I_o$).

In an alternative form, if the intensity (output power) of the light source is constant, then it is sufficient only to measure the reflected light—there is no need to form the ratio.

As previously explained, the directed light source 30 produces a directed beam of light 35, preferably having a beam size in the range 0 mm² to 25 mm². The beam of light 35 is incident, preferably at an angle of between 30° and 60°, on a coating of dampening solution 58 (or ink, as the case may be) on a printing plate 60. It will be appreciated that the dampening solution 58 shown in FIG. 1 is an idealised representation, and that the true surface covering is non-uniform on a micro-level due to the porous nature of printing plates.

Provided liquid does not completely cover the printing plate 60, the intensity of the specular beam 45 in the reflected direction increases monotonically with the degree of dampening solution cover, as will be demonstrated presently. The reflected beam 45 intensity tends to saturation when dampening solution 58 completely covers the printing plate 60.

By means of the associated data processor, such as the personal computer 70 or the on-board microprocessor 130, it is then possible to determine a ratio of the intensity of the reflected beam of light 45 versus the intensity of the directed beam of light 35. The ability to identify such changes in the coating of dampening solution 50 enables the operators of printing presses to reduce the amount of spoilt product. Thus, a quantitative near real-time measurement of dampening solution thickness is available to aid in the production of high quality printed product.

Figure 3:
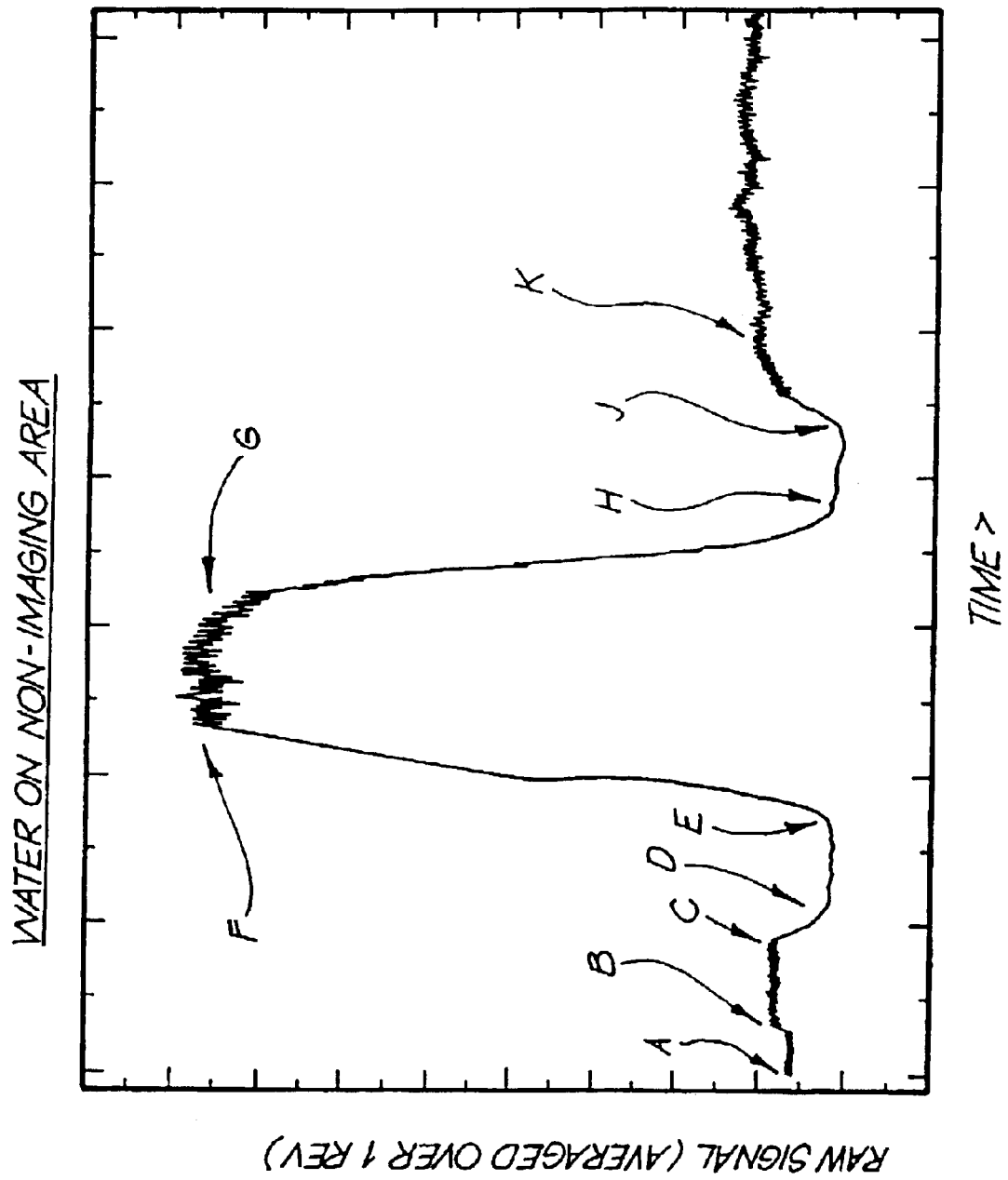
FIG. 3 is a graph showing measured reflected light intensity as the amount of dampening solution is varied.

FIG. 3 shows a graph obtained by an embodiment of the apparatus shown in FIG. 2 (i.e., with only the reflected light detector 40 connected) during testing performed on a Roland 2000 offset printing machine. The y-axis is the measured reflected signal over time. At point A, the printing press is printing at approximately 3000 sheets per hour and producing output agreed to be of high quality. At point B, the flow of dampening solution is adjusted upwards by a small increment and allowed to stabilise to point C. At point C, the flow of dampening solution is reduced downwards by a significant value, and when point D is reached there is little dampening solution remaining on the printing plate. The flow of dampening solution is then increased at point E. Point F shows that the dampening level stabilises, but that there is too much dampening solution present, which is how the state remains until point G. Once more, the flow of dampening solution is reduced, and by point H the printing plate has very little dampening solution present. At point J, the dampening solution is restored to slightly more than its original rate of flow at point A and stabilises at point K and beyond.

It can be seen that there is a monotonically increasing relationship between the ratio of measured reflected light versus input signal and the thickness of the dampening solution coating the printing plate. Thus, observation of the signal ratio gives a reasonably good measure of dampening solution thickness.

Figure 4:
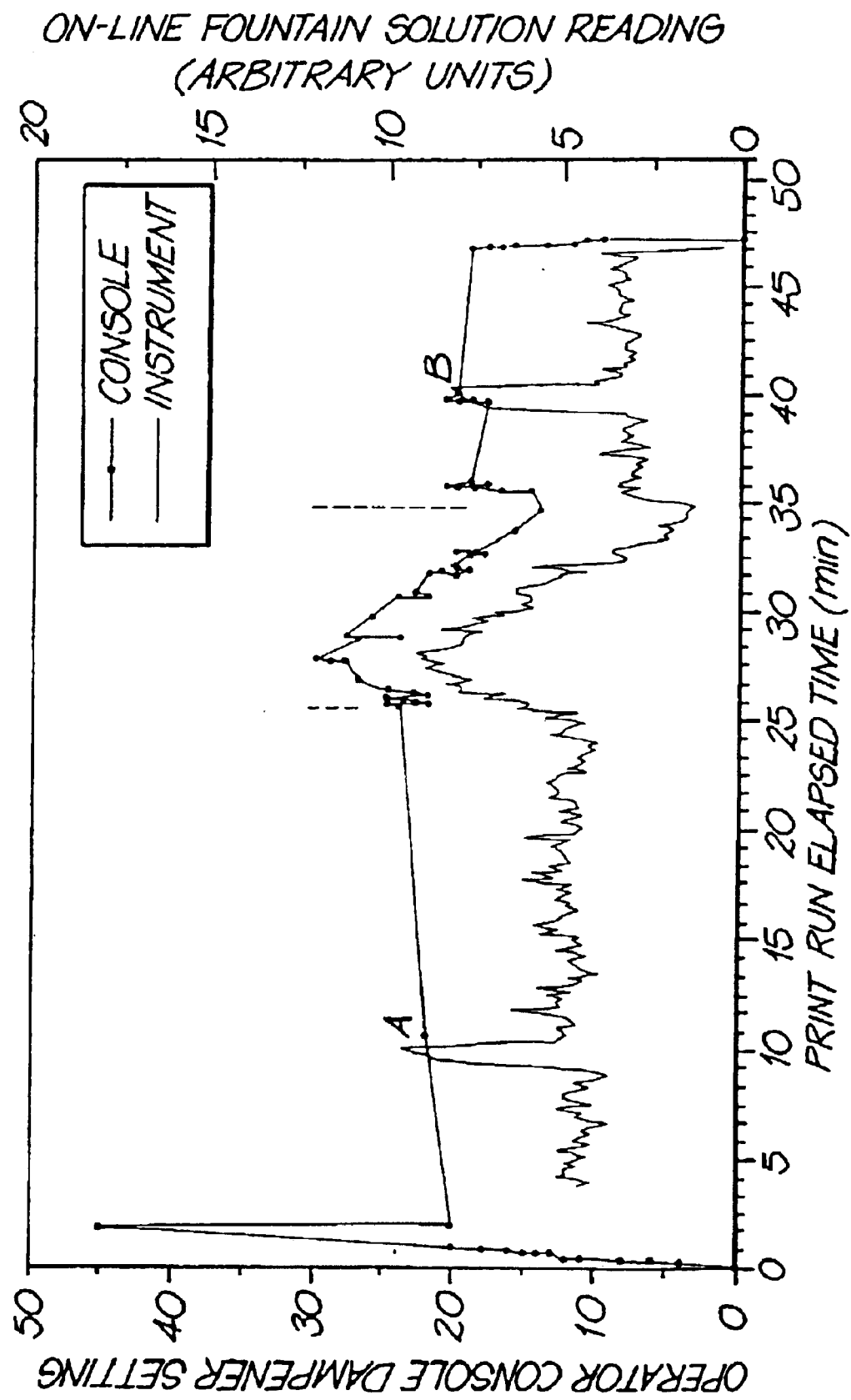
FIG. 4 is a graph showing the relationship between console instrumentation measurements and measurements of an embodiment of the apparatus, the measurements having been obtained during a trial.

FIG. 4 shows data obtained from testing an embodiment of the apparatus using a MAN-Roland Colorman 40 printing press operating at 50,000 newspaper pages per hour (i.e., a double round cylinder rotating at 25,000 revolutions per hour). During a 46 minute print run, data was logged to the data processor 70 at a data rate of approximately 3 kHz. In order to verify the results of the apparatus, a video camera was set up for the duration of the print run to monitor an operating display console and a clock for elapsed time during the run. Each change in the dampener reading on the console was subsequently logged against the elapsed time of its occurrence. The top trace (ie. "console") represents the console setting, and the bottom trace (ie. "tmfi") the reflected intensity determined by the instrument 10 of FIG. 2.

Approximately 26 minutes into the print run, the dampener setting was increased each minute by approximately 2 units until the dampener reading showed 30 units. Each minute thereafter, the dampener setting was decreased by approximately 2 units until the console display showed 14 units. At that time, colour printing problems became evident, with excess blue ink visible on the examined pages. The dampener control was then returned to a normal setting of approximately 20 units. It can be seen from the graph that the reading obtained from the instrument 10 is generally in accordance with the console instrumentation. It is evident, however, that the instrument 10 detected large transients at points A and B, probably due to splashes of dampening solution on the printing plate, which went undetected by the console instrumentation. Within the normal dampener setting range used in the newspaper industry, the response of the apparatus appears to be approximately linear. Furthermore, it has been shown that the instrument achieves satisfactory measurements in an industrial environment and at commercial printing speeds.

Figure 5:
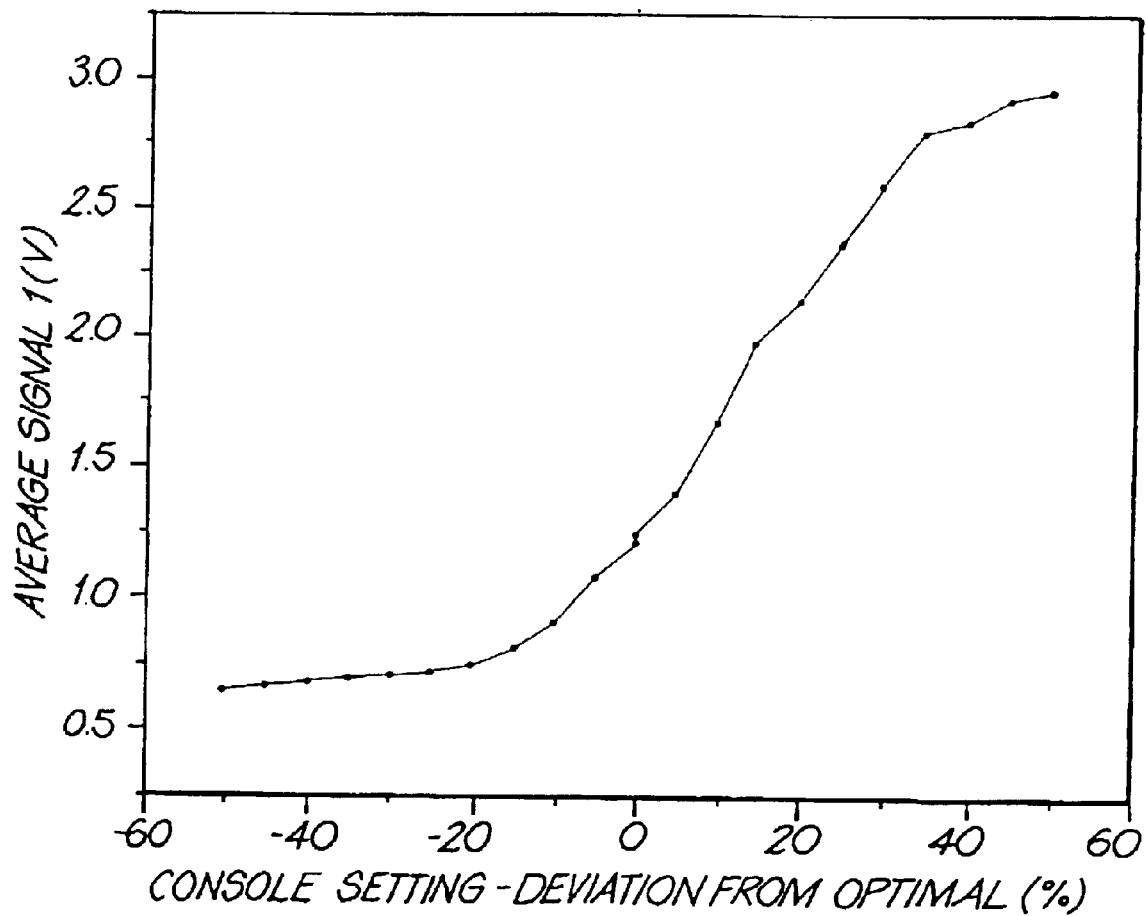
FIG. 5 is a graph demonstrating the correspondence of instrument measurements with a production control signal.

FIG. 5 relates to measurements obtained with the instrument 10 mounted on a MAN Roland Colorman S machine. Discernible measurements of dampening solution thickness are determined and the y-axis shows an averaged output signal, derived from the reflection detector 40. The x-axis shows machine console instrumentation as measured deviation from optimal dampening solution coverage of the printing plate (expressed as a percentage). The data again indicates a monotonically increasing function of dampening solution thickness.

Determination of Imaging Density

As discussed, the instrument 10 gathers light scattered from the roller surface of a printing press. The amount of light intensity measured is substantially independent of the level of dampening solution present on the plate. The magnitude of the detected signal is sensitive to the surface roughness of the roller and the presence and amount of ink on the roller. Measuring the light intensity in the scattered signal in this manner provides an indication of several factors (to be described presently) including the surface roughness of the roller, the variations of ink density in an imaging area, and the presence of ink in non-imaging areas (commonly referred to as scumming).

Figure 6:
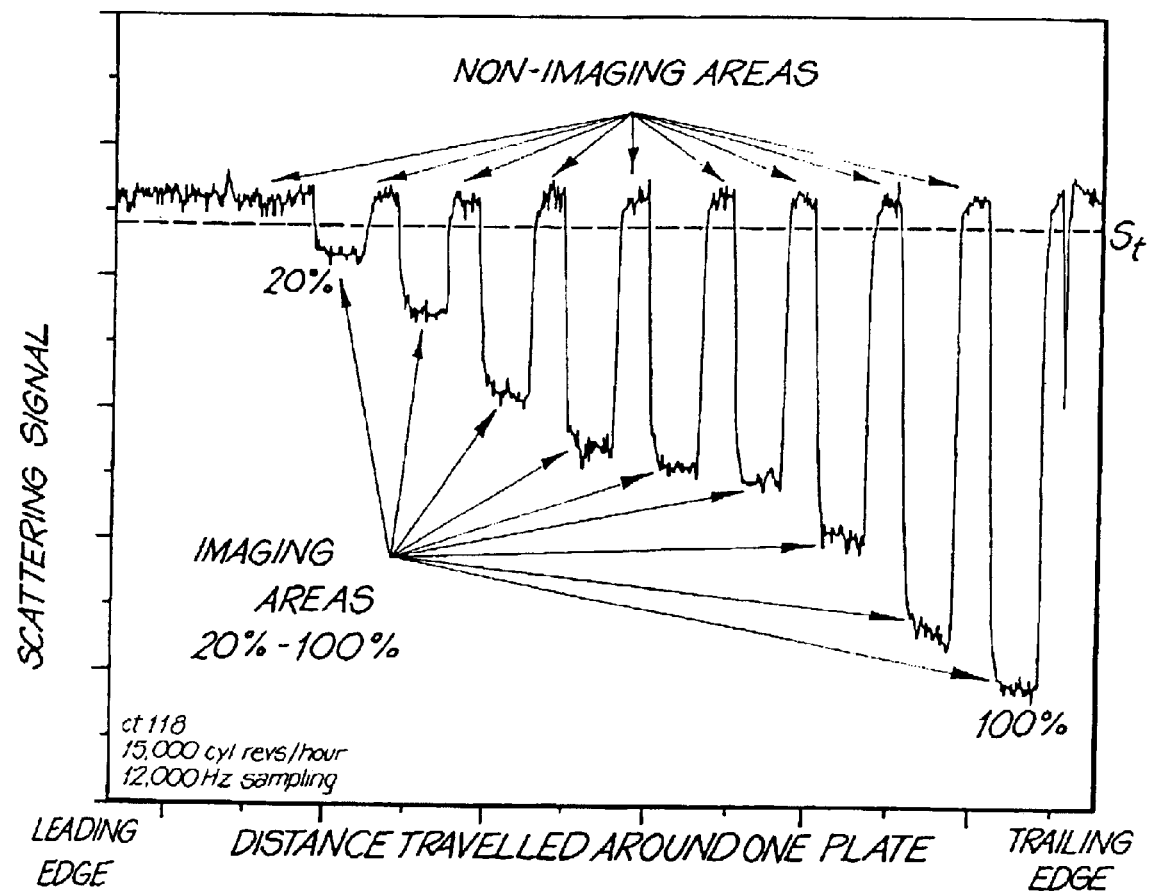
FIG. 6 shows data demonstrating the determination of imaging density from a test pattern on a test plate.

Specifically, the scattering detector 50 can be utilised to measure the image density on a printing plate, as has been established in trials on newspaper presses operating at full press speed. FIG. 6 shows the signal from the scattering detector 50 recorded for one printing plate (MAN Roland GEOMAN press operating at 15,000 cyl revs/hour). The plate consisted of a test pattern of imaging blocks with increasing image density. A substantially higher signal is measured from the non-imaging areas (labelled). The values of measurements from non-imaging areas are substantially similar across the plate and are substantially independent of the amount of dampening solution concurrently being measured. According to well-established light scattering models (eg. Rayleigh and Mie), the scattering signal is predominantly related to the wavelength of light and the dimension of the roughness of the measured medium, i.e. the printing plate. Thus, the magnitude of the scattering signal for non-imaging areas provides a relative measurement by which the state and preparation of printing plates can be reckoned.

As indicated in FIG. 6, areas of different imaging density can be readily distinguished. By ascribing a threshold value, $S_t$, (as shown), the set of data representing the imaging areas or non-imaging areas can be uniquely identified (i.e. respectively below and above the line). The 'above the threshold value' data can provide context to (substantiation of) the concurrently measured dampening solution measurement. In other words, the specularly reflected light signal from the reflection detector 40—giving a measure of dampening solution thickness—can be qualified by the exclusion of imaging area data by way of high-pass filtering the scattering data in accordance with the threshold value. In a data processing sense, the signal from the scatter detector 50 is compared with a defined threshold setpoint and the resulting signal used to determine whether measurement region is imaging or non-imaging.

Determination of Ink Thickness

The pattern of imaging contribution on a printing plate should not change during a particular print run, but, the amount of ink applied to the plates may vary. By repeated measurement of the scattering signal at a known fixed imaging point, then the relative variation in the amount of ink can be calculated. In the sense of FIG. 6, it is the process of identifying a relative change in the magnitude of a data point representing an imaging area. It is thus important that the instrument 10 is able to repeatedly take measurements at substantially the same position on the printing plate in order to ensure that measurements during the print run are directly comparable (ie. from the same area of imaging density).

The target level of inking is obtained when the maximum colour density is achieved. If the amount of ink provided is less than the target the ink density does not achieve the maximum possible. If the ink level is too high, more dampening solution will be required to prevent scumming, and the ink density may also be less than the maximum possible due to excessive emulsification of the ink and water. In addition, an emulsified ink layer leads to low permanency of the printed product. This manifests as rub-off of ink on the reader's hands or set-off, which is the impression of one page on its opposite member when the newsprint is cut and folded in the press.

Using the scatter and reflect detectors 40, 50 described, under-density can be correlated with the dampening level. If the dampening level is normal (relative to a previously determined setpoint, e.g. at initial optimisation of the print job), ink density may be improved by increasing the ink. Conversely, if the dampening level appears to be higher than normal, ink density may be improved by reducing both water and ink.

Figure 7:
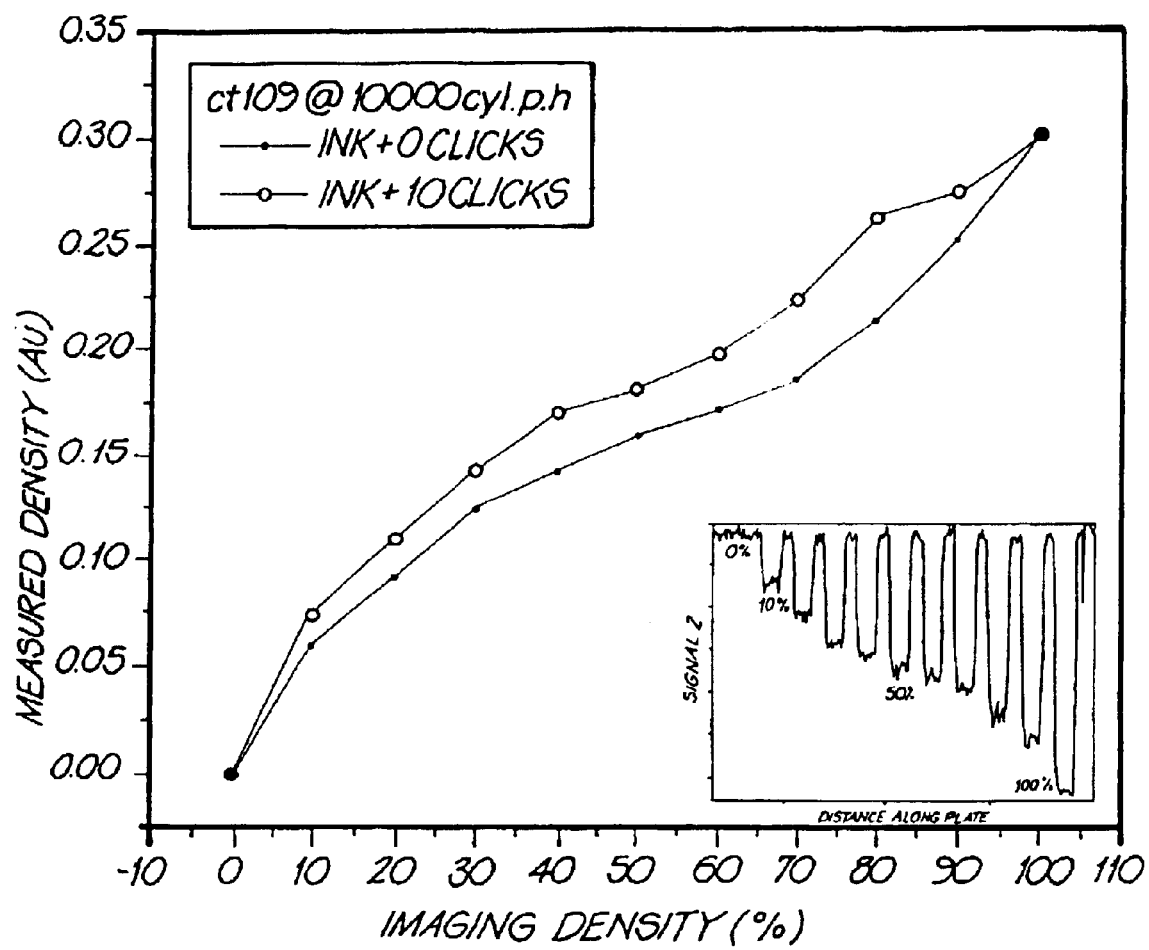
FIG. 7 is a graph showing thickness measurements.

FIG. 7 shows thickness measurements for a printing plate test pattern consisting of imaging blocks ranging from 10% to 100% density. The insert shows the appearance of the actual scattered signal measurement for one impression of the test pattern. The entire pattern is measured on every impression. The main graph depicts scattered signal step heights for the pattern under (non-optimised) "normal" printing conditions and also after the ink key setting was increased by '10 clicks'. Across the density range of 10 to 90% the measured scattered signal steps have increased by 20%. At 0% (no imaging) the signal has remained the same (no ink to measure), as has the 100% density block (indicating this is already at maximum density).

Utilising simultaneous measurements of the dampening and ink density it is possible to place both ink and dampening levels under feedback control.

Plate Gap Detection System

Another use for the signal collected by the scatter detector 50 is for detecting gaps. For example, the scatter intensity measurement enables timing or gating of a printing plate. The reflected light detector signal, r(t), also may be used for gap detection, either on its own or in conjunction with the scatter signal, s(t).

Accurate detection of the plate gap at typical press operating speeds requires a time resolution better than 100 $\mu$s. Data acquisition rates in excess of 12,000 samples per second are also required to achieve this performance. Using a data acquisition system for this purpose places significant requirements on analog-to-digital converters and processing speed. In addition, this arrangement captures vastly more data than is required for dampening solution measurement.

Figure 8:
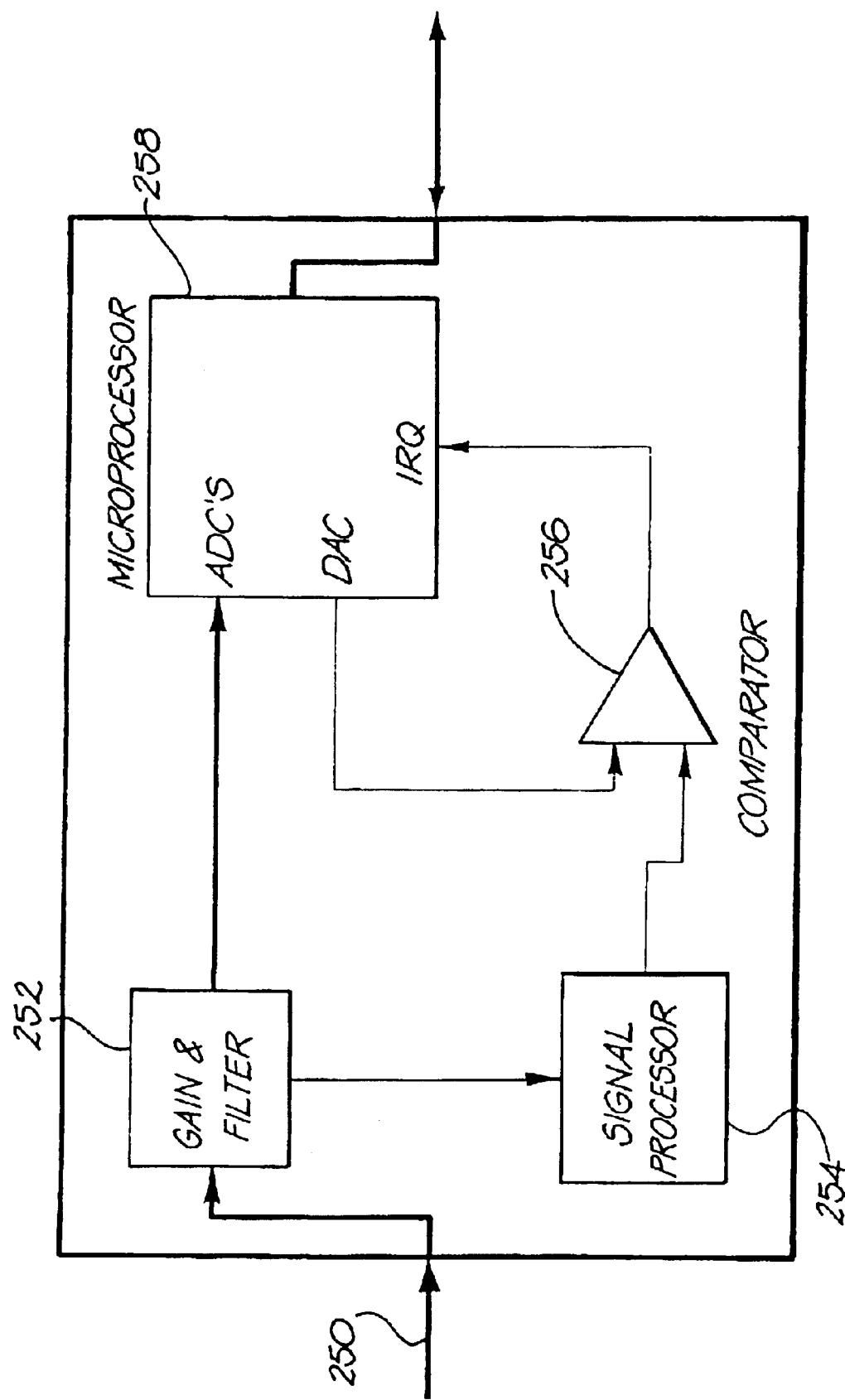
FIG. 8 is a schematic circuit diagram of a plate gap detection system.

In a reduction to practice, a hybrid microprocessor/hardware based gap detection system is preferred as shown in FIG. 8. The analog measurement signal 250 containing gap information from either the reflection sensor 40 or the scatter sensor 50 (characterised by zero signal) undergoes amplification and filtering 252 and then additional signal processing 254 before being imputed into a comparator 256. The comparison level is provided by a digital-to-analog signal from the microprocessor 258 and can be determined automatically or set manually. When gap conditions are identified by the comparator 256 an interrupt request signal is sent to the microprocessor 258.

Gap signals are used by the microprocessor 258 to reckon the plate cylinder rotation speed and also to synchronise the data acquisition such that a much-reduced rate of measurement is required to ensure spatial registration on the plate. For example, for measuring the same position on subsequent cylinder rotation.

The gap signal measurements can also be important for determining the exact spatial positions on the plate and for differentiating between the two plates if the particular press has two printing plates around the circumference of the plate cylinder.

Automated Measurement Synchronisation

Figure 9A:
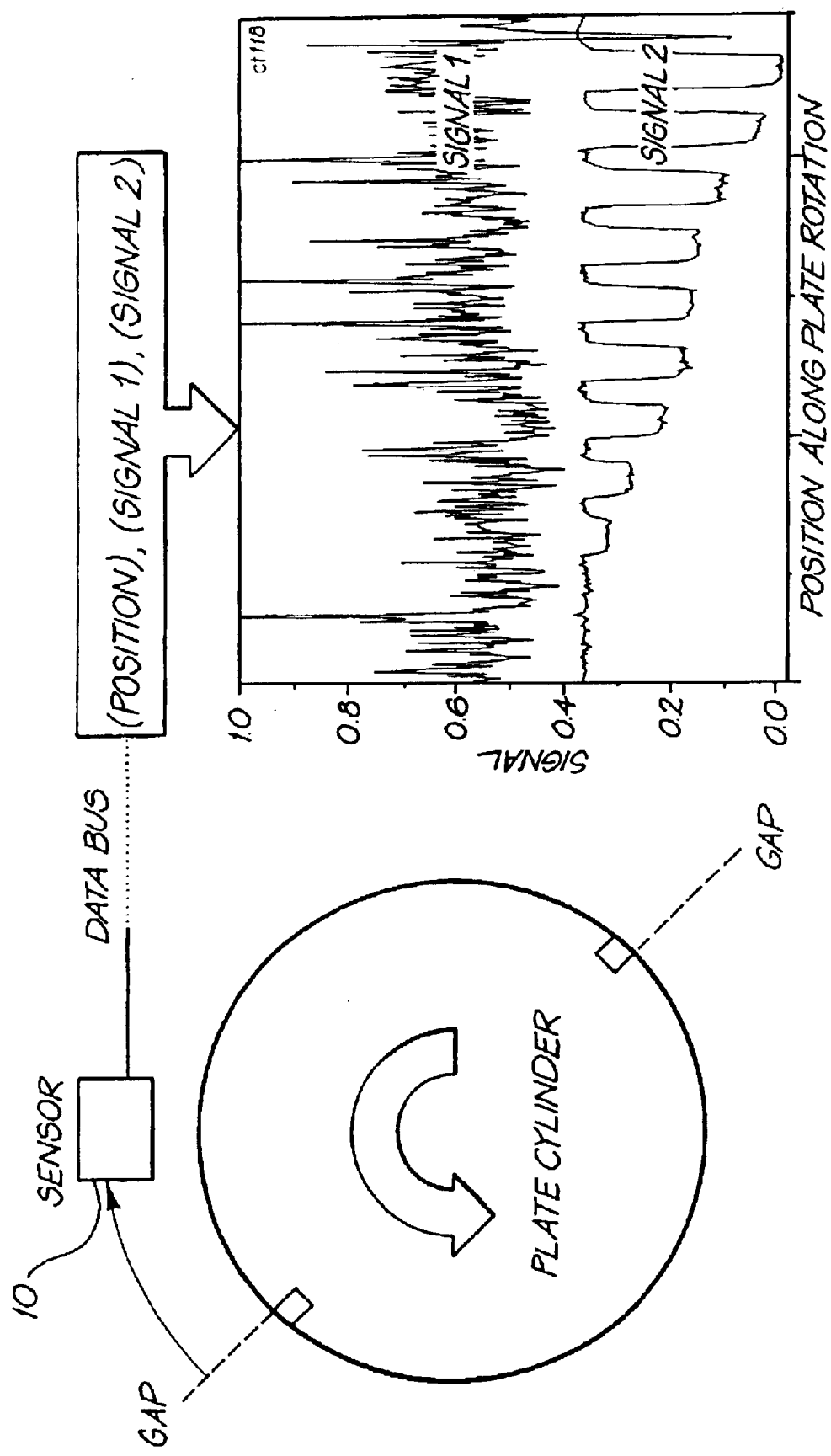
FIG. 9A shows an arrangement and data for the automated measurement synchronisation.

By integrating the features of microprocessor control, interrupt request-based gap detection, press speed reckoning and microprocessor programming, automated measurement synchronisation capability is achieved. Referring to FIG. 9A, the instrument 10 synchronises to the press operation by the detection of plate gaps (as described). By timing sequential gaps, the microprocessor accurately reckons the press speed. A single or plurality of (spatial) measurement positions on the plate are specified either through direct programming of the microprocessor or via digital communication from a host system. Using these specified locations, gap synchronisation and press speed reckoning as inputs, the microprocessor calculates accurate timing trigger points for the successive plate measurement. At the calculated times, the microprocessor conducts measurements and following any other processing that may be instructed, the results pertaining to that particular spatial position on the plate are communicated to the host (ie. as [position], [reflect signal], [scatter signal]).

Figure 9B:
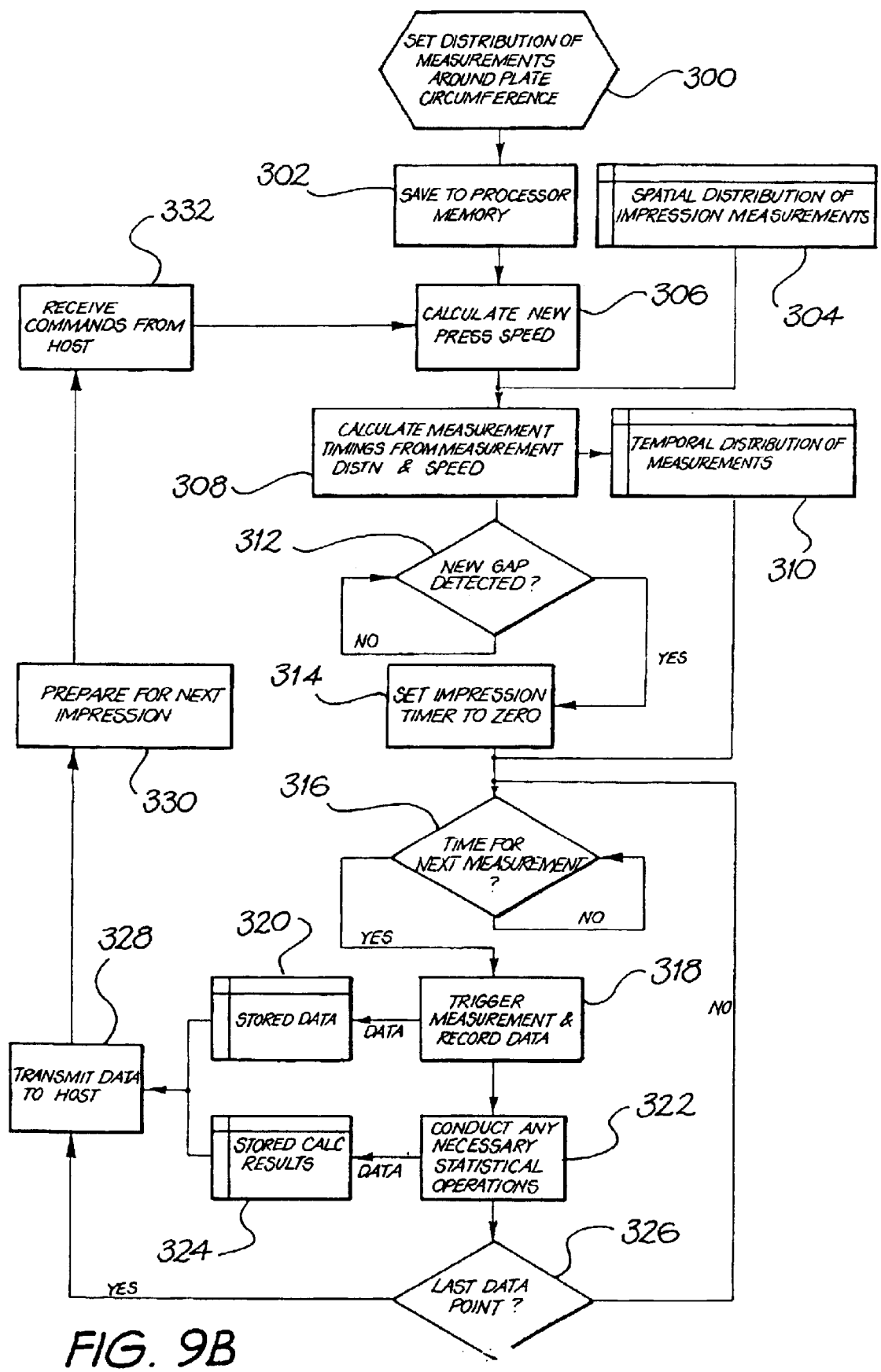
FIG. 9B is a flow chart relating to the automated measurement synchronisation of FIG. 9A.

FIG. 9B shows a flow chart describing implementation of automated measurement synchronisation.

In step 300, a predetermined specification of the distribution of measurements to be made around the plate circumference is determined. In step 302, this information is stored in a memory location. This creates a library of the spatial distribution of impression measurements 304. In step 306 the press speed is calculated, and together with the spatial distribution of impression measurements, allow, in step 308, the calculation of a set of time-based triggers which can be used in the next measurement cycle, creating a library 310 of temporal distribution of measurements.

In step 312, the process waits for the protection of the next plate gap. Upon detection of the plate gap, step 314 triggers the start of the measurement for the plate impression and causes a timer to be reset. In step 316 a comparison is made between the current value of the timer and a data acquisition event. Once these coincide, in step 318, a measurement and data record is triggered, resulting in the creation of a stored data record 320. In step 322, any necessary statistical operations are performed, resulting in a creation of a data record of statistical calculations 324. In step 326 a check is made as to whether the last data point has been sampled, and if not, then the process loops back to 316. If the last data point has been processed, then, in step 328, the stored data record and calculation results are transmitted to the host. In step 330, the process prepares for the next impression, and awaits commands from a host in step 332 before repeating the process from step 306.

Using this scheme, the device achieves its maximum spatial resolution and spatial repeatability, but also maintains data communication at a moderate level. The host system, to which the results are communicated, need not be a powerful acquisition and processing system. This integrated design facilitates the integration of the instrument with systems controllers typically implemented in press control.

Average Dampening Solution Thickness Calculation

Figure 10:
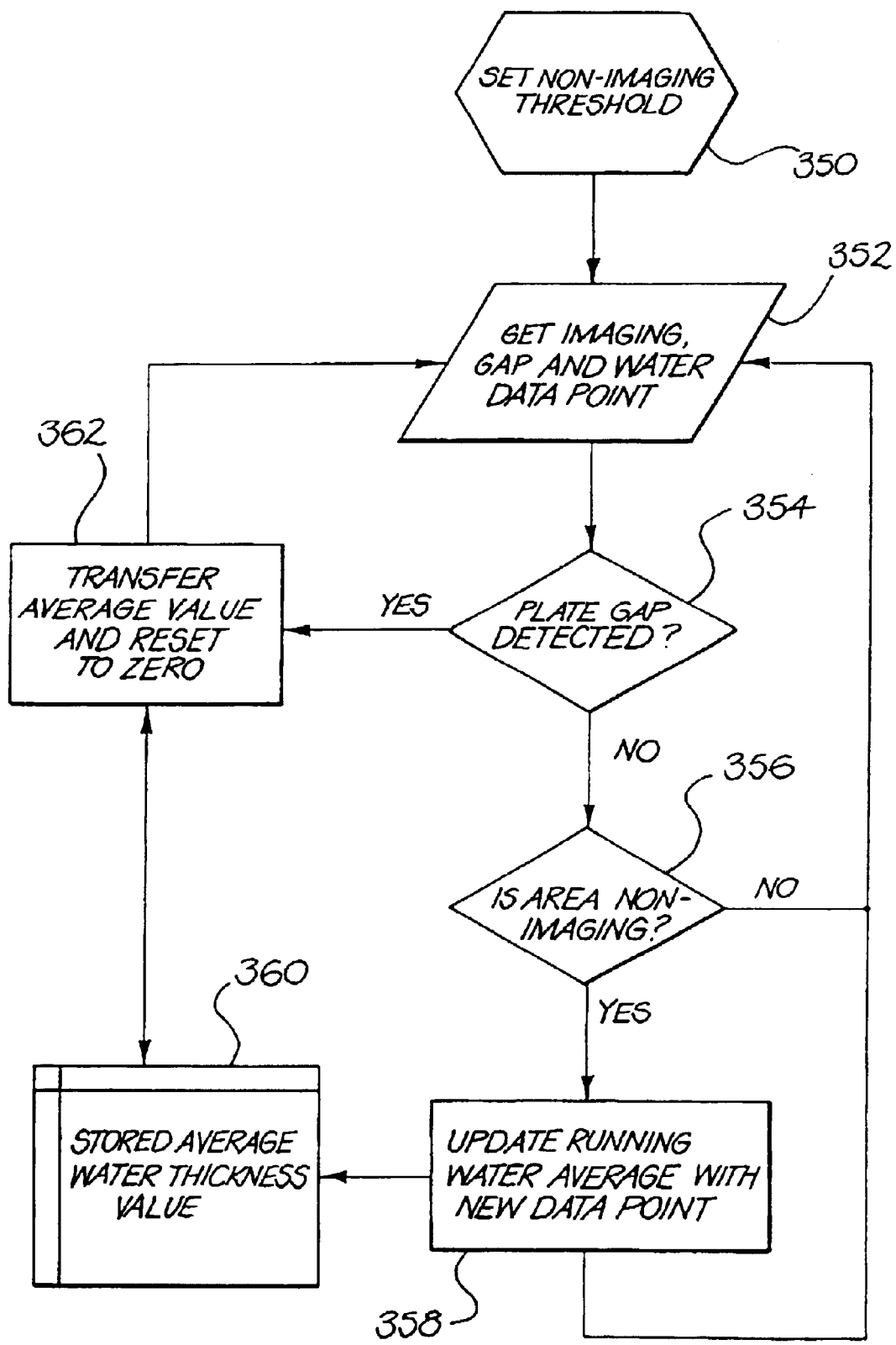
FIG. 10 is a flow chart relating to the determination of average dampening solution thickness.

As discussed with reference to FIG. 6, the measurement and calculation of average dampening solution thickness on a printing plate can be performed in a manner to automatically discriminate and exclude measurements from imaging areas. FIG. 10 is a flow chart detailing the implementation of such a process.

In step 350, the non-imaging threshold is set. In step 352, data is acquired from the reflection sensor 40 and the scatter sensor 50. Next, in step 354, the printing plate gap is detected. If the result is "no" then the data point is taken from the printing plate, and in step 356, a determination is made as to whether the area is non-imaging. This is done by testing the scattering signal data value against the threshold, $S_t$. If the data value is above the threshold then the result of the comparison is "yes" and, in step 358, a running dampening solution average is updated with the new value of the reflected signal, and stored as a record 360 of average dampening solution thickness value. On the occurrence of the plate gap being detected in step 354, then, in step 362, the average value of dampening solution thickness value is transferred.

Closed-Loop Control of Dampening Solution Application

Industry procedures do not presently involve a direct measure of the dampening solution thickness. There are a number of ways in which such a measurement may be integrated into a semiautomatic or fully automatic dampening control system. In a first embodiment, the instrument is integrated locally into the dampening controller. In this configuration, the press control system instructs the dampening system to supply a particular dampening solution film thickness to the plate. The dampening controller then uses the dampening solution film thickness measurement to internally correct the dampening it applies to the plate in a manner that maintains a constant dampening film thickness. This arrangement is particularly suited for the correction of short-term and long-term drift in the dampening system response, because the feedback control loop can have a very small time constant.

Figure 11:
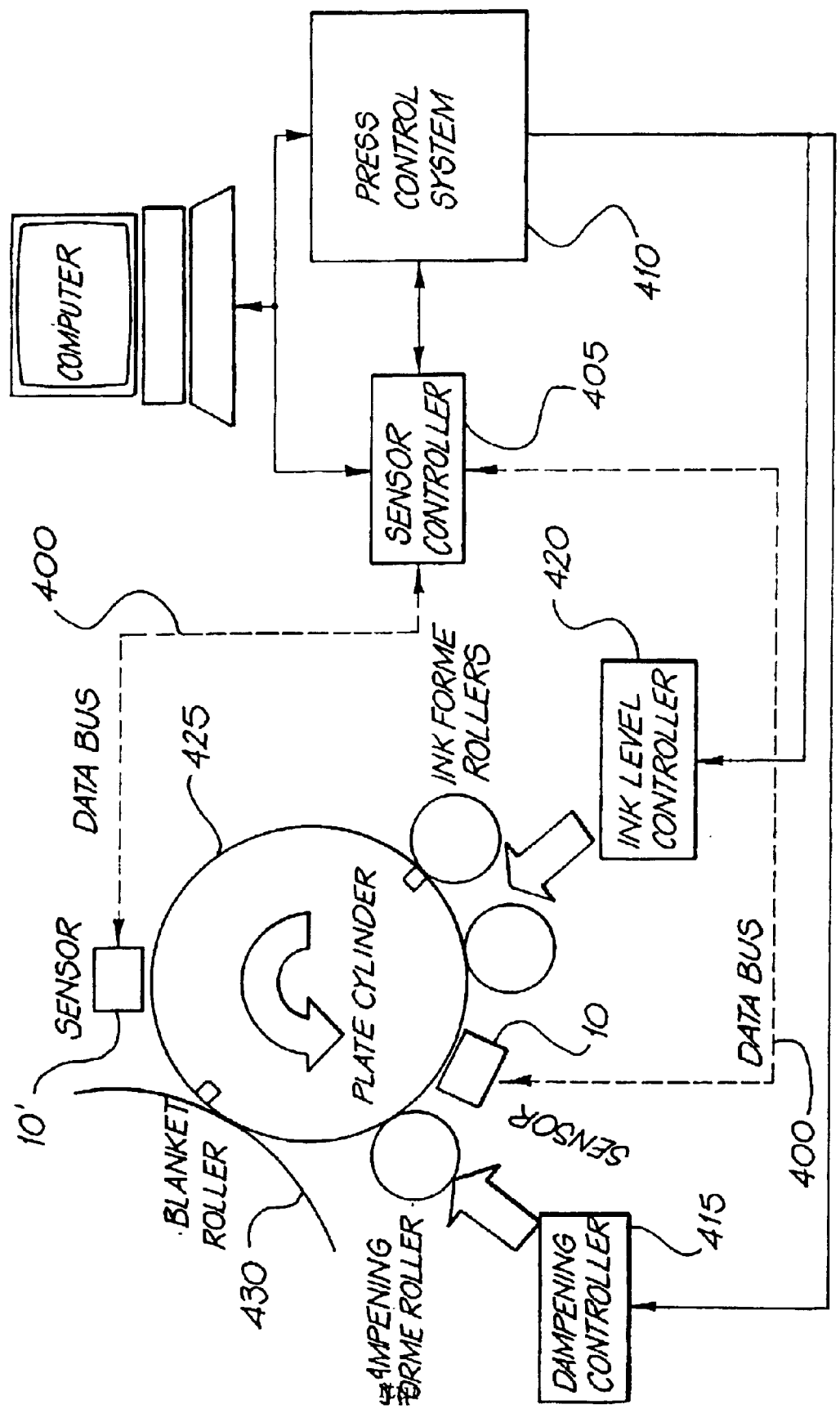
FIG. 11 is a schematic diagram concerning optimisation of press feedback characteristics.

In a second embodiment, shown in FIG. 11, the instrument 10 is directly connected into the press control system 410 via a data bus 400 and sensor controller 405. A press operator can monitor and control the level of dampening on each plate 425. If the water film thickness drifts away from the desired setting, the press control system 410 instructs the dampening control system 415 to increase or decrease the level of dampening, as required. In the setup, the operator and the press control system possess a much more complete indication of the conditions within the press. This could be very important if, for example, the press controller is used to adjust the water/ink balance in response to any of the multitude of parameters set up currently measured by the press control system 410.

Before printing presses can be used in an optimum setting, the entire system must be characterised and optimised using a protracted and intensive method of "footprinting" the press. This procedure can involve several days of measurement and adjustment, during which the printed quality varies to such a degree that the output cannot be used for commercial purposes. Therefore, footprinting a press tends to be a wasteful and expensive process. The incorporation of the present instrument onto the printing plates 425 with signals transferred back to the press controller 410 enables the press to be automatically maintained within a specified output quality band. The press operator is able to adjust press parameters such as ink levels or dampening levels in order to characterise the press, but any adjustment that causes the output quality to fall below the preset value is immediately counteracted by the press control system. Therefore, even during footprinting, a nominal output quality of the press could be ensured above a predetermined level and this would permit the footprinting procedure to be conducted within a commercial run. This would confer significant waste and cost advantage to the press owners.

Automatic Optimisation of Press Feedback Characteristics

A further aspect of FIG. 11 provides a mechanism for reckoning the optimal feedback behaviour for different press configurations.

The minimal installation consists of an instrument 10 linked via a communications bus 400 to a sensor controller 405. The sensor controller 405 is, in turn, connected to the press control system 410. The press control system 410 instructs the dampener control system 415 when to apply dampening and also how much dampening to apply. Integration of the instrument with the dampener controller 415 enables the dampening controller to monitor the actual amount of dampening is present on the plate and, therefore, provides a feedback mechanism by which an error signal is calculated and used to correct the amount of dampening. Press configuration variations that alter the dampening requirements are automatically corrected via the feedback mechanism. Such factors include, but are not limited to, variations in the temperature of press components (e.g. heating of plate cylinder leads to increased evaporation of dampening solution, variations in paper absorbency, plate wear).

Integrating the sensors directly or indirectly with the press control system enables full measurement and feedback control by means of algorithms in the press control software. Maintaining the centrality of the press control system permits the most flexible approach in which the entire press system is considered.

Both dampening solution and ink levels are feedback controllable using this approach. Variations in ink density could be attributed to a variation in either the ink or the dampening level and corrected accordingly. 'For ink, either the same or a further instrument 10, 10' can be utilised, connected to the same data bus 400. The ink level controller 420 is in communication with the press control system 410.

Optimisation of feedback characteristics within the control systems requires an estimation of the dynamic responses of the press to instructions issued by the controller. Positioning of the instruments on the printing plates enables a much more rapid and, therefore, stable feedback mechanism than inspection of the printed material as it exits the press. A preferred method of estimating the press response dynamic is to operate the press at acceptable print quality output and once a stable configuration is achieved a significant perturbation in the dampening is then applied (automatically, using a computer or the press controller). Ink and dampening levels will be monitored. Examination of the speed, magnitude and oscillatory components of the response will permit estimation of the feedback parameters (such as Proportional, Integral and Differential—PID) using either conventional feedback methodologies or adaptive process control mechanisms such as neural networks or artificial intelligence. In a further optimisation procedure the press will be operated under feedback control of ink and water and the dampening manually perturbed. Effectiveness of the feedback control to return the press to the original operational settings will be gauged and the feedback parameters adjusted as necessary to closely approximate a critically damped system as far as practicable. Approaches of this nature are well documented; for example: "Implementation of Self Tuning Controller", Kevin Warwick, 1988, Peter Perigrenus, UK (ISBN 0863411274), or "Self-Tuning Systems: Control & Signal Processing", P. E. Wellstead and M. B. Zarrop 1991, John Wiley & Sons (ISBN 0471928836).

An analogous approach involving inking level perturbations may also be conducted.

Scumming Detection

Scumming is the result of running a printing press with insufficient dampening solution. Ink from the ink forme rollers migrates to the non-imaging area of the printing plate, because there is insufficient water to prevent the adhesion of ink to the non-imaging area of the plate. The visual result of scumming is a mottled pattern of ink across the printed page. Scumming is most undesirable. The scattered light detector 50 in the instrument is sensitive to the absorption of light due to the presence of ink. Thus, the output signal, s(t), can also be used to determine when scumming occurs. The signal may be integrated into either the dampening controller or the press controller system (as above), which will then make the requisite adjustments to prevent further scumming.

Figure 12A:
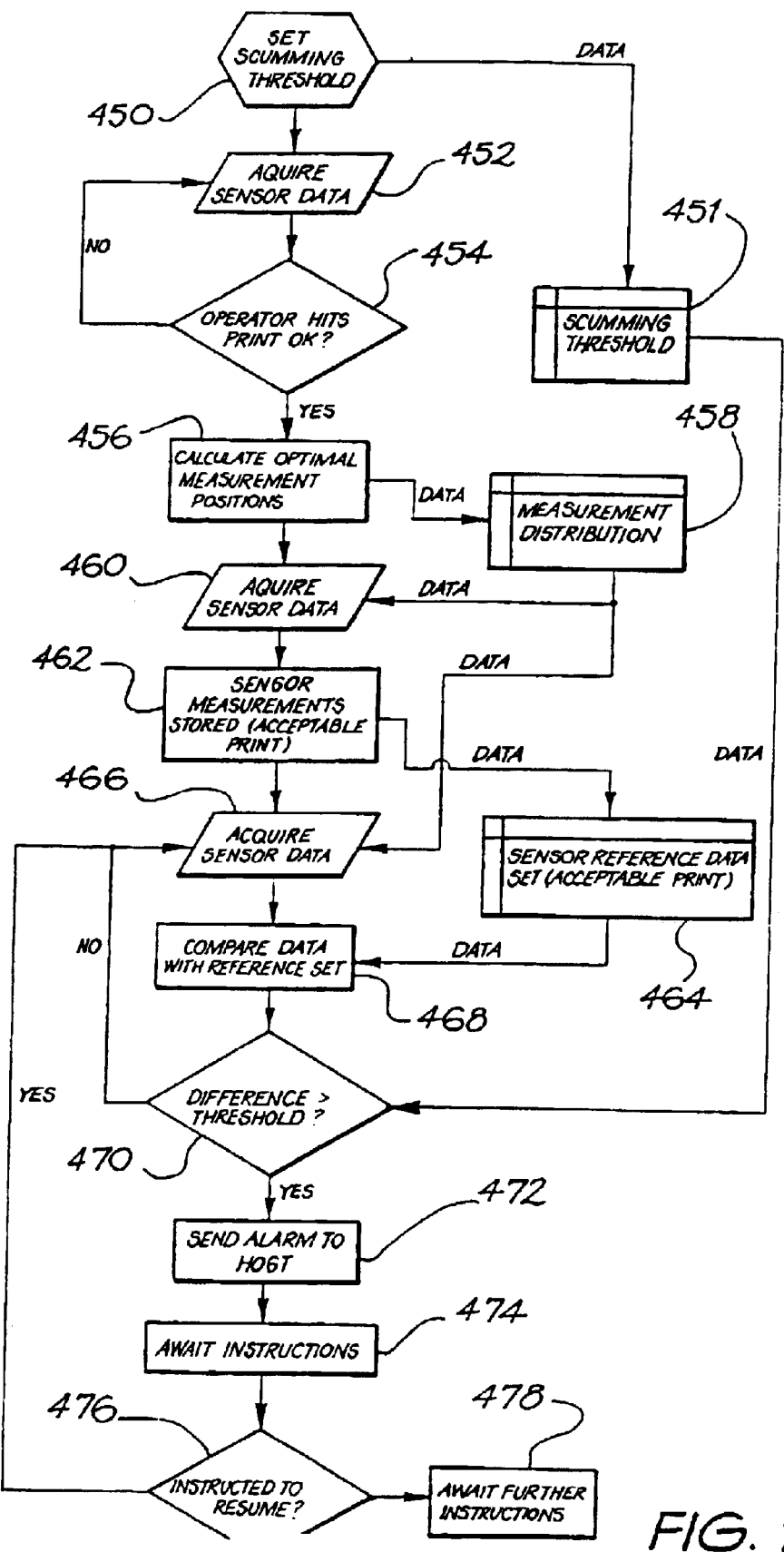
FIG. 12A is a flow chart relating to the detection of scumming.

FIG. 12A is a flow diagram describing how scumming detection may be implemented. In step 450, a numerical value for the scumming threshold is provided. The scumming threshold is stored as a record 451. Steps 452 and 454 represent the continual acquisition of data from the scatter light detector 50 at one or more non-imaging positions until the point that the press operator determines the press is operating acceptably. Once this occurs, then in step 456 a set of preferred measurement positions is calculated and stored as a distribution record 458. These positions may represent positions known from previous experience to be prone to early scumming compared with the remainder of a printing plate (e.g. an area of non-imaging immediately followed of a high-density imaging).

In step 460, a data acquisition cycle is conducted based upon the measurement distribution record 458. This data set represents the reference set for acceptable print quality, and is stored as such in step 462 and for which a sensor reference data set record is established 464. The process then enters a monitoring phase in which data is acquired for the complete plate impression in step 466, then, in step 468, compared with the reference record 464. If it is determined in step 470 that the difference is greater than a threshold value, then, in step 472, an alarm is sent to the host. In step 474 further instructions are awaited which, in step 476 can be to resume the monitoring, at step 466, or cease monitoring and await further instructions, at step 478.

Figure 12B:
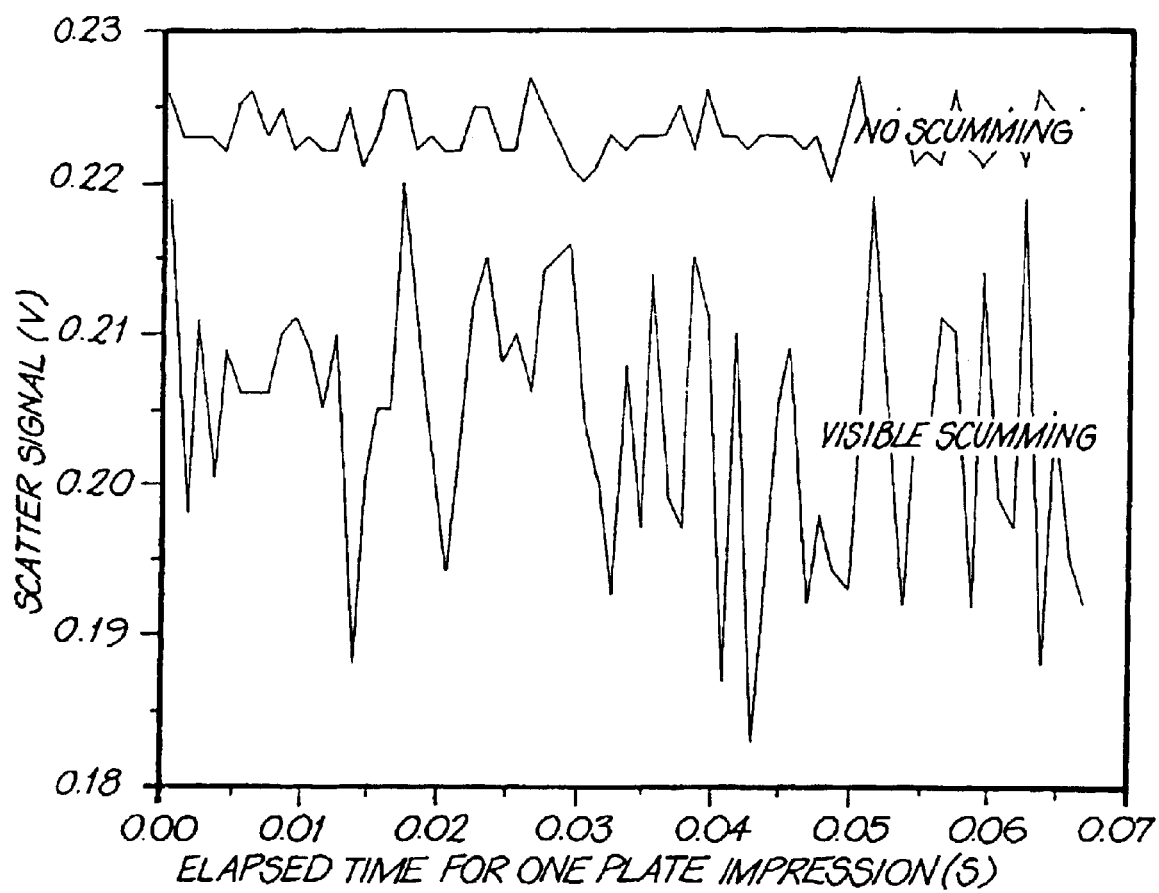
FIG. 12B is a graph showing measurements for the detection of scumming.

FIG. 12B shows a graph depicting examples of the signal derived from scattering detector 50 during a commercial newspaper print run using a MAN Roland GEOMAN press machine. The upper graph shows the response when no scumming is being observed. Across the plate surface the scattered signal remains within a tight band. When scumming occurs, as depicted in the lower trace, ink is observed across the page of the printing output and this ink is also observed on the plate by the scattering detector. The magnitude of the average signal decreases and the apparent noise of the signal increases. By training a control system with the spatial distribution of the non-imaging areas during a period of no scumming it is possible for the instrument data processing to distinguish when ink is evident in the any non-imaging areas (ie. scumming). When employed throughout a printing press, and with such signals being relayed back to the press controller, the operator will be alerted when scumming occurs in any position during the print run.

As mentioned above, the sensor is capable of initially characterising whether measurement areas are composed of an imaging or non-imaging area. This information may be used to direct the scumming detection measurement to areas known to be non-imaging. As scumming tends to begin immediately following a block of high image density, scumming detection can be concentrated in such areas.

Measurement of Water Thickness in Post-Blanket Position

The measurements described to this point have assumed that the instrument's position is after dampening and inking, but before the blanket roller (see FIG. 10). The interaction between the blanket roller 430 and the plate cylinder 425 is such that water and ink are transferred from the plate cylinder onto the blanket roller and then transferred onto the paper. Instruments embodying the invention thus may be employed both before and after contact with the blanket roller. In the post-blanket position, the instrument 10 can measure any residual dampening solution thickness, indicating that not all of the water is transferred to the blanket roller.

Figure 13:
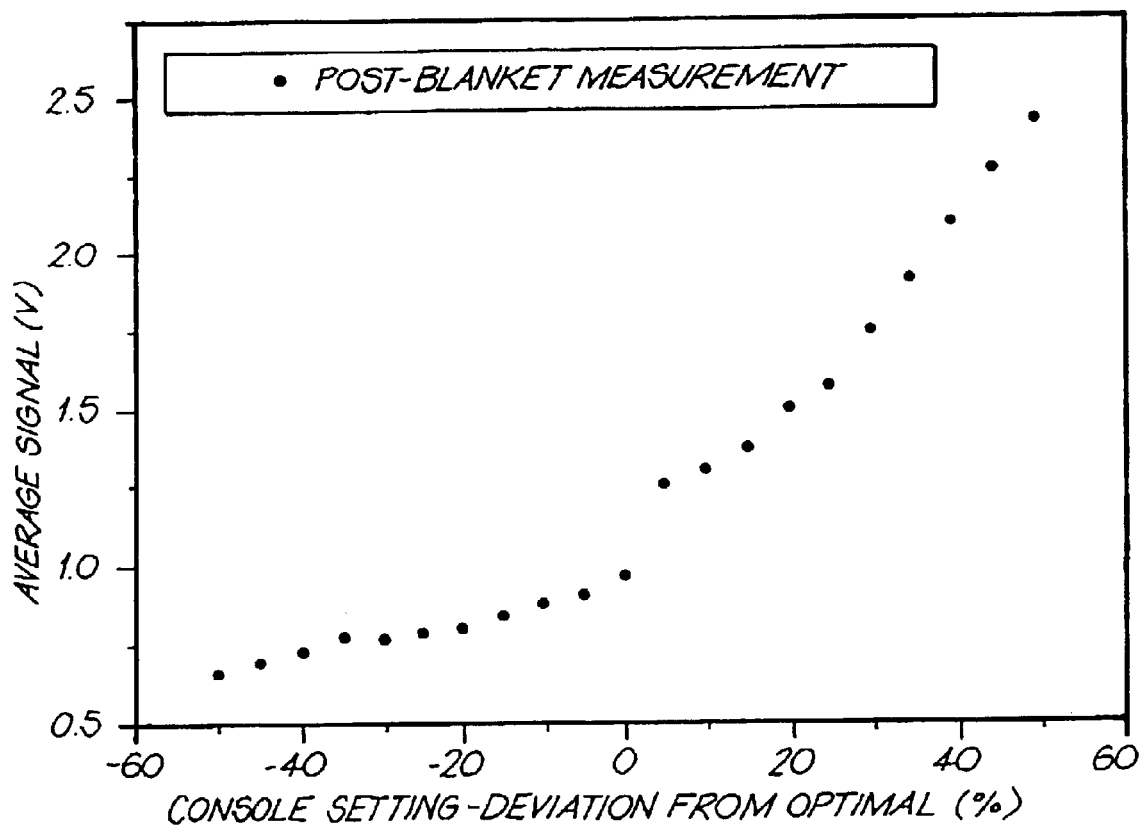
FIG. 13 shows data of post-blanket measurements of dampening solution thickness.

FIG. 13 shows the result of measuring post-blanket water thickness at various dampening settings (shown along the x-axis). The graph demonstrates the viability of measuring in the post-blanket position, because the water film thicknesses are of the same order of magnitude as in the pre-blanket position.

Instrument Locations

Figure 14:
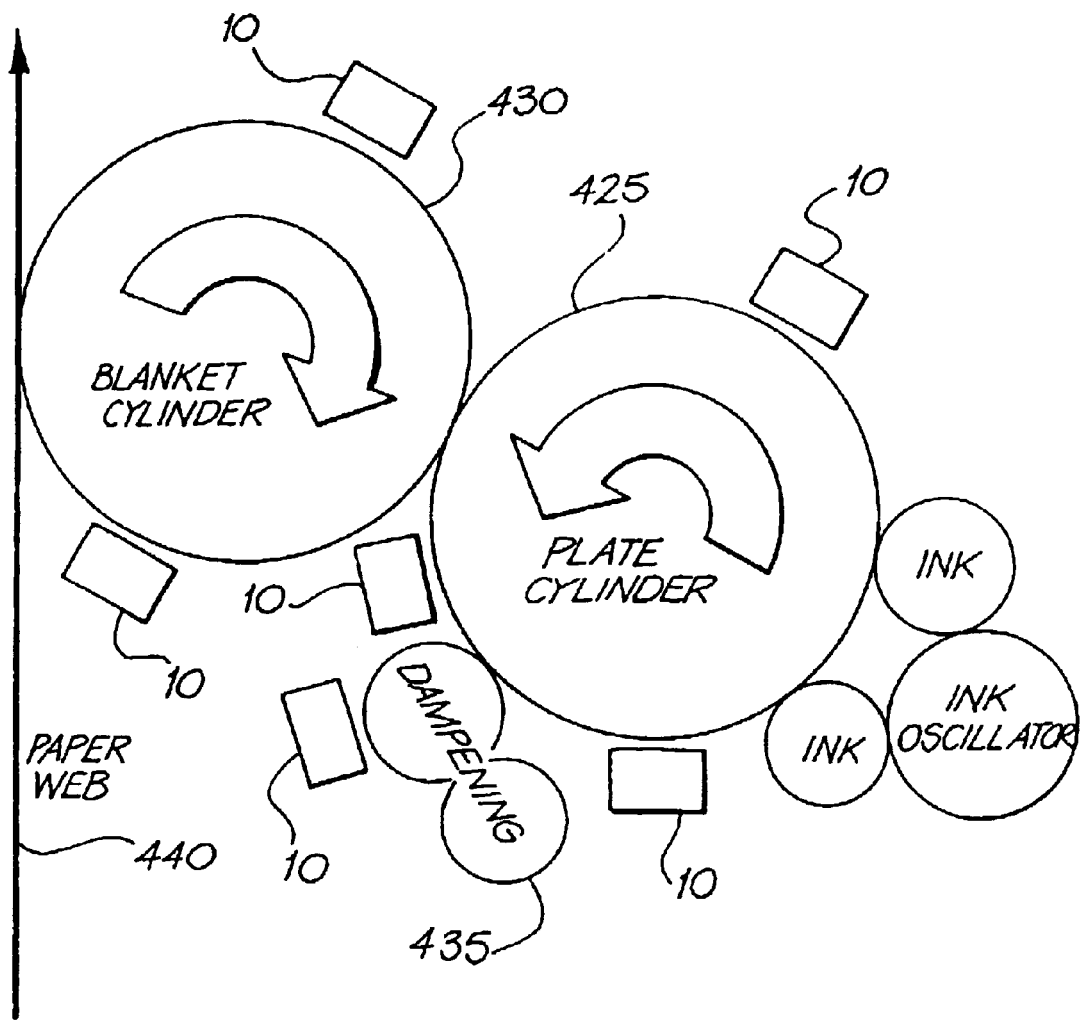
FIG. 14 is a diagram showing possible instrument locations.

It will be readily recognised by one practiced in the art that the instrument positioning is not limited to measurement on the printing plates. Measurements may also be gainfully conducted on the dampening solution delivery forme rollers 435 or on the blanket roller 430 that transfers ink and dampening solution from the plate 425 to the paper 440. It will also be recognised that there are a plurality of positions on both the blanket roller 430 and plate cylinder 425 that will provide gainful information. FIG. 14 shows a plurality of positions in which the instrument may be installed.

Further Advantages Offered by Embodiments of the Invention

In contrast with the prior art, embodiments of the present disclosure do not require test patterns because the sensor system is capable of simultaneously determining the water level and the ink density. Also, the measurement is conducted very close to the point of printing and, therefore, does not incur the time latency involved with downstream paper measurement. This enables a more effective control loop to be implemented.

The effect of the Brewster Angle reflectance variations can be reduced by using s-polarised light (i.e., electric vector orthogonal to the incidence plane).

The incorporation of protective transparent windows recessed into sensor housing is advantageous. These windows are maintained in a contamination free state by the application of a constant stream of clean air onto the window surface. Recession of the windows into the instrument body provides a tube along which air travels to the external environment. This flow prevents the ingress of even ballistic contaminants, such as rapidly moving fluid droplets or particular bodies.

The custom filters (such as thin film interference filters) incorporated into enables the passage of the light source intensity; but blocks light intensity from potentially interfering sources such as artificial lighting or sunlight. Optical filters may also be composed of polarising elements that optically analyse the light signal prior to detection. The optical filter may also consist of a focusing element providing improved sensitivity and reduced susceptibility to stray light interference.

It will be recognised by one skilled in the art that the instrument may be gainfully installed on a scanner mechanism that translates the instrument detectors across the width of the press.

An instrument such as described can be applied to other surfaces on printing presses, such as the blanket, and water or ink forme rollers.

The foregoing describes only one embodiment/some embodiments of the present invention, and modifications and/or changes can be made thereto without departing from the scope and spirit of the invention, the embodiment(s) being illustrative and not restrictive.

What is claimed is:

1. A method for determining the occurrence of scumming in an offset printing press, including the steps of:
    directing a light source at a moving component;
    detecting light scattered from said moving component and forming an intensity signal thereof;
    storing a record of one or more positions representing non-imaging areas; and
    data processing said scattered light intensity signal to identify the presence of ink at least one of the positions.

2. A method as claimed in claim 1, wherein said data processing step includes comparing said scattered intensity signal against a threshold value representing the onset of scumming.

3. A method as claimed in claim 2, wherein said threshold value is derived from data collected from a printing plate absent ink.

4. A method of operating an offset printing press including the steps of:
    directing a light source at a moving component;
    detecting light scattered from said moving component and forming an intensity signal thereof;
    storing a record of one or more positions representing non-imaging areas;
    data processing said scattered intensity signal to identify the presence of ink at at least one of the positions; and
    adjusting the ink and/or dampening liquid controls of the press to avoid scumming when onset of conditions indicative of scumming is detected.

5. An instrument for determining the occurrence of scumming in an offset printing press, including:
    a light source for directing light at an offset printing plate, the light source being of a known intensity;
    a light detector for receiving light scattered from said plate and producing an intensity signal thereof; and
    a data processor storing a record of one or more positions representing non-imaging areas, and processing said scattered intensity signal to identify the presence of ink at said positions.

6. An instrument as claimed in claim 5, wherein said data processor compares said scattered intensity signal against a threshold value representing the onset of scumming.

7. An instrument as claimed in claim 6, wherein said threshold value is derived from data collected from a printing plate absent ink.

8. An instrument as claimed in claim 7, wherein the light source is a polarised beam of laser light arranged to be incident on the offset printing plate at approximately 60° to the normal direction from the plate, the laser light being incident over an area of substantially less than 25 mm$^2$.

9. A method of operating an offset printing press including the steps of
    (a) directing a beam of light onto an offset printing plate of the press having image areas carrying printing ink and non-image areas carrying a dampening liquid, the beam being incident on the offset printing plate to be scattered therefrom and specularly reflected therefrom,
    (b) detecting the scattered light and providing a corresponding first signal representative of the intensity of detected scattered light,
    (c) detecting the specularly reflected light and providing a corresponding second signal representative of the intensity of the detected reflected light
    (d) processing the first signal to identify when the light falls on image areas,
    (e) using data from processing the first signal to filter the second signal to provide an output signal when the light is directed on a non-image area, the output signal indicating the amount of dampening liquid present on the printing plate, and
    (f) controlling a supply of ink to the image areas of the printing plate using the first signal, the first signal indicating the thickness of ink present on the printing plate.

10. A method as claimed in claim 9, wherein the output signal is used to control a supply of dampening liquid to the offset printing press.

11. A method as claimed in claim 9, wherein the light is laser light directed onto the offset printing plate to determine in near real time the effective thickness of the dampening liquid whereby the printing press is regulated to maintain desired operating performance during a print run.

12. A method as claimed in claim 11, wherein the first signal is used to control supply of ink and the output signal is used to control supply of dampening liquid to the press.

13. A method as claimed in claim 11, wherein tho light is directed at 30° to 60° to the surface of the offset printing plate.

14. A method as claimed in claim 11, wherein the laser light is passed through a collimating lens, polarised and focussed to form an incident spot on the offset printing plate of the press of an area less than 25 mm².

15. A method as claimed in claim 14, wherein light detection is by silicon photo-diode detectors having an active area of about 15 mm² and operating at wavelengths in the range of 400 to 1050 nm.

16. A method as claimed in claim 9, wherein the light is laser light directed onto the offset printing plate at approximately 60° to the normal from the offset printing plate.

17. A method as claimed in any one of claims 9, 11 or 16 wherein the detection of scattered and specularly reflected light is performed by scanning detectors across the width of the offset printing press.

18. A method as claimed in claim 9 and including using a threshold value for scattered light from a non-imaging area, comparing data when the beam of light is Incident on a non-imaging area, comparing data with the threshold data and, if above the threshold data, determining that the beam is incident on a non-imaging area and incorporating the date into a running average indicative of the amount of dampening liquid in the non-imaging area, the method further comprising analysing the first and second signals to determine when a gap exists between printing plates and initiating transfer of the acquired average value corresponding to amount of dampening liquid and resetting the averaging device to zero for determining a further plate value.

19. A method as claimed in claim 9 and further comprising using the first signal to control synchronisation with the printing plate.

20. A method as claimed in claim 19 and further comprising using the second signal for printing plate gap detection and producing a gap signal in real time which is then used to determine plate cylinder rotational speed and to synchronise data acquisition and to determine spatial positions on the printing plate.

21. Apparatus for controlling an offset printing press having
   (i) means for directing a beam of light onto an offset printing plate of the press having image areas carrying printing ink and non-image areas carrying a dampening liquid, the beam being incident on the offset printing plate to be scattered therefrom and specularly reflected therefrom,
   (ii) means for detecting the scattered light and providing corresponding first signal representative of the intensity of detected scattered light,
   (iii) means for detecting the specularly reflected light and providing a corresponding second signal representative of the intensity of the detected reflected light,
   (iv) means for processing the first signal to identify when the light fails on image areas,
   (v) means for using data from processing the first signal to filter the second signal to provide an output signal when the light is directed on a non-image area, and the output signal indicating the amount of dampening liquid present on the printing plate, and
   (vi) means for controlling a supply of ink to the image areas of the printing plate using the first signal, the first signal indicating the thickness of ink present on the printing plate.

22. Apparatus as claimed in claim 21, and wherein the means directing a beam of light provides laser light incident the offset printing plate at an angle of about 60° to the normal from the printing plate and the laser light being incident on the plate over a relatively small area substantially less than 25 mm².

23. An offset printing press including apparatus as claimed in claim 21.

24. A method of operating an offset printing press including the steps of
   (g) directing a beam of light onto an offset printing plate of the press having image areas carrying printing ink and non-image areas carrying a dampening liquid, the beam being incident on the offset printing plate to be scattered therefrom and specularly reflected therefrom,
   (h) detecting the scattered light and providing a corresponding first signal representative of the intensity of detected scattered light,
   (i) detecting the specularly reflected light and providing a corresponding second signal representative of the intensity of the detected reflected light
   (j) processing the first signal to identify when the light falls on image areas,
   (K) using data from processing the first signal to filter the second signal to provide an output signal when the light is directed on a non-image area, the output signal indicating the amount of dampening liquid present on the printing plate, and
   (l) providing a synchronisation signal for synchronising data acquisition with the press operation and determining spatial positions on the printing plate.

25. A method as claimed in claim 24, wherein the synchronisation signal is obtained using the first signal and/or the second signal.

26. A method as claimed in claim 25, wherein the synchronisation signal is obtained by using the first signal and/or the second signal for printing plate gap detection and producing a gap signal in real time which is then used to determine plate cylinder rotational speed and to synchronise data acquisition and to determine spatial positions on the printing plate.

27. A method as claimed in claim 24, wherein the output signal is used to control a supply of dampening liquid to the offset printing press 28. A method as claimed in claim 24, wherein the first signal is used to control ink supply to the image areas of the offset plate.

29. A method as claimed in claim 24, wherein the light is laser light directed onto the offset printing plate to determine in near real time the effective thickness of the dampening liquid whereby the printing press is regulated to maintain desired operating performance during a print run.

30. A method as claimed in claim 29 wherein the first signal is used to control supply of ink and the output signal is used to control supply of dampening liquid to the press.

31. A method as claimed in claim 29, wherein the light is directed at 30° to 60° to the surface of the offset printing plate.

32. A method as claimed in claim 29, wherein the laser light is passed through a collimating lens, polarised and focussed to form an incident spot on an offset printing plate of the press of an area less than 25 mm².

33. A method as claimed in claim 32, wherein light detection is by silicon photo-diode detectors having an active area of about 15 mm² and operating at wavelengths in the range of 400 to 1050 nm.

34. A method as claimed in claim 33 wherein the output signal is used to control a supply of dampening liquid and the first signal is used to control ink supply.

35. A method as claimed in claim 24, wherein the light is laser light directed onto the offset printing plate at approximately 60° to the normal from the offset printing plate.

36. A method as claimed in any one of claims 24, 29 or 35, wherein the detection of scattered and specularly reflected light is performed by scanning detectors across the width of the offset printing press.

37. A method as claimed in claim 24, wherein the first signal is used to control supply of ink and the output signal is used to control supply of dampening liquid to the press.

38. A method as claimed in claim 24 and including using a threshold value for scattered light from a non-imaging area, comparing data when the beam of light is incident on a non-imaging area, comparing the data with the threshold data and, if above the threshold data, determining that the beam is incident on a non-imaging area and incorporating the data into a running average indicative of the amount of dampening liquid in the non-imaging area, the method further comprising analysing the first and second signals to determine when a gap exists between printing plates and initiating transfer of the acquired average value corresponding to amount of dampening liquid and resetting the averaging device to zero for determining a further plate value.

39. Apparatus for controlling an offset printing press having (i) means for directing a beam of light onto an offset printing plate of the press having image areas carrying printing ink and non-image areas carrying a dampening liquid, the beam being incident on the offset printing plate to be scattered therefrom and specularly reflected therefrom, (ii) means for detecting the scattered light and providing a corresponding first signal representative of the intensity of detected scattered light, (iii) means for detecting the specularly reflected light and providing a corresponding second signal representative of the intensity of the detected reflected light, (iv) means for processing the first signal to identify when the light fails on image areas, (v) means for using data from processing the first signal to filter the second signal to provide an output signal when the light is directed on a non-image area, and the output signal indicating the amount of dampening liquid present on the printing plate, and (vi) synchronisation means for providing a synchronisation signal for synchronising data acquisition with the press operation and determining spatial positions on the printing plate.

40. Apparatus as claimed in claim 39, and wherein the means directing a beam of light provides laser light incident on the offset printing plate at an angle of about 60° to the normal from the printing plate and the laser light being incident on the plate over a relatively small area substantially less than 25 mm$^2$.

41. Apparatus as claimed in claim 39, wherein the synchronisation means comprises means for printing plate gap detection using the first signal and/or the second signal to produce a gap signal, means for determining plate cylinder rotational speed based on the gap signal, and means for synchronising data acquisition and determining spatial positions on the printing plate.

42. An offset printing press including the apparatus as claimed in claim 39.

* * * * *